United States Patent
Salonen

(10) Patent No.: US 11,144,850 B2
(45) Date of Patent: Oct. 12, 2021

(54) PAYMENT METHOD AND SYSTEM

(71) Applicant: BOOKIT OY AJANVARAUSPALVELU, Helsinki (FI)

(72) Inventor: Jukka Salonen, Luhtajoki (FI)

(73) Assignee: BOOKIT OY, Helsinki (FI)

( * ) Notice: Subject to any disclaimer, the term of this patent is extended or adjusted under 35 U.S.C. 154(b) by 966 days.

(21) Appl. No.: 14/179,451

(22) Filed: Feb. 12, 2014

(65) Prior Publication Data

US 2014/0164031 A1  Jun. 12, 2014

Related U.S. Application Data

(63) Continuation-in-part of application No. 13/868,409, filed on Apr. 23, 2013, now Pat. No. 8,856,017, which is a continuation of application No. 11/980,470, filed on Oct. 31, 2007, now Pat. No. 8,050,664, which is a continuation of application No. 10/227,194, filed on Aug. 21, 2002, now Pat. No. 7,406,429.

(30) Foreign Application Priority Data

Aug. 21, 2001 (FI) ...................... 20011680

(51) Int. Cl.
| | |
|---|---|
| G06Q 10/02 | (2012.01) |
| G06Q 20/40 | (2012.01) |
| G06Q 30/06 | (2012.01) |
| H04M 3/42 | (2006.01) |
| G06Q 10/10 | (2012.01) |
| G06Q 20/32 | (2012.01) |

(52) U.S. Cl.
CPC ........... *G06Q 10/025* (2013.01); *G06Q 10/02* (2013.01); *G06Q 10/109* (2013.01); *G06Q 20/3276* (2013.01); *G06Q 20/40* (2013.01); *G06Q 30/0601* (2013.01); *H04M 3/42382* (2013.01)

(58) Field of Classification Search
CPC .... G06Q 10/02; G06Q 30/0613; G06Q 20/14; G06Q 20/40; G06Q 10/025; G06Q 10/109; G06Q 20/3276; G06Q 30/0601; H04W 12/06; H04M 3/42382
USPC ............................................................ 705/5
See application file for complete search history.

(56) References Cited

U.S. PATENT DOCUMENTS

| | | | | |
|---|---|---|---|---|
| 6,016,484 A | * | 1/2000 | Williams ............... | G06Q 20/00 235/375 |
| 6,771,981 B1 | * | 8/2004 | Zalewski ............... | B67D 7/145 455/557 |

(Continued)

OTHER PUBLICATIONS

SMS Banking Services: A 21st Century Innovation in Banking Technology (Year: 2007).*

*Primary Examiner* — Zeina Elchanti
(74) *Attorney, Agent, or Firm* — Barnes & Thornburg LLP

(57) ABSTRACT

A method and system for communicating over a telecommunications network between a service provider and one or more users, wherein the service provider can have access to multiple distinct addresses I the telecommunications network and each user is identified by an address, more specifically, where a first message can be sent over at least a portion of the telecommunications network to a user's address and based on a response from the user determining the message to which the response is a reply.

17 Claims, 12 Drawing Sheets

(56) References Cited

U.S. PATENT DOCUMENTS

| | | | |
|---|---|---|---|
| 2002/0069420 A1* | 6/2002 | Russell | H04L 63/0428 |
| | | | 725/92 |
| 2002/0107809 A1* | 8/2002 | Biddle | G06F 21/105 |
| | | | 705/59 |
| 2003/0088461 A1* | 5/2003 | Christensen | G06Q 20/387 |
| | | | 705/14.37 |
| 2003/0128822 A1* | 7/2003 | Leivo | G06Q 20/425 |
| | | | 379/93.02 |
| 2004/0243520 A1* | 12/2004 | Bishop | G07F 7/1008 |
| | | | 705/75 |

\* cited by examiner

PAYMENT METHOD AND SYSTEM

CROSS REFERENCE TO RELATED APPLICATIONS

This patent application is a continuation-in-part of U.S. patent application Ser. No. 13/868,409, filed Apr. 23, 2013, which is a continuation of U.S. patent application Ser. No. 12/972,610, filed Dec. 20, 2012, which is a continuation of U.S. patent application Ser. No. 11/980,470, filed Oct. 31, 2007, now U.S. Pat. No. 8,050,664, which is a continuation of U.S. patent application Ser. No. 10/227,194, filed Aug. 21, 2002, now U.S. Pat. No. 7,406,429, which claims priority to Finnish Patent Application No. 20011680, filed Aug. 21, 2001, the disclosures of which are incorporated herein by reference in their entirety.

FIELD OF THE INVENTION

The present invention relates to a payment method and system utilizing telecommunications. Further, the invention relates to a method and system for booking a reservation in a booking system and synchronizing bookings in several booking systems comprising at least one booking systems; involving at least one service provider; a mediator service; a client, and at least one client terminal device that can be a mobile device and that includes a dialogue. In addition, the system comprises telecommunication connections that are used to connect the booking systems, the service providers, the mediator, and the client terminal device.

BACKGROUND OF THE INVENTION

Services that are booked or used via the Internet are constantly increasing. The Internet enables one to use several on-line services such as services connected to banks, health services, travel agencies, vehicle maintenance, and so on.

The increasing popularity of mobile computing and communications devices introduce new challenges to services on the Internet. Mobile terminals are able to deliver information to users when needed and where needed. Users want ubiquitous access to information and applications from the device at hand. They also want to access and update this information wherever they happen to be.

It is important to notice, however, that not all the terminals will be mobile. Future services must be able to communicate with a large variety of terminal devices, both those that are mobile and those that are not. Different terminal devices have very different capabilities.

The interoperability of different services and terminal devices requires standards on several levels. It is not enough to have, say, common communication protocols. It would be very important to share common concepts and understanding what a certain piece of data means in a certain context. However, it has been very difficult to agree on those issues, as there exist an enormous number of companies, organizations, and other actors in the field.

Many services must be able to manage bookings. They include for example booking appointments for health services; booking travel reservations for hotels, airlines, and rental cars; booking tickets for venues; booking appointments for vehicle maintenance; booking maintenance for apartments; and so on. It would be very useful, if those services could get information from one another. For example, if a customer is booking tickets for a concert, he or she might want to book a table in a restaurant also. It helps, if the restaurant's booking service gets basic information, like date and customer's name from the theater's booking system. Unfortunately, there have not been methods to exchange information between different kinds of booking systems.

There are many methods to exchange information between services. Speaking of services that include booking or calendar functions, information exchange often takes place as synchronizing booking or calendar entries. For that purpose, several important standardization efforts are going on. For example, SyncML is an industry initiative to develop and promote a single, common data synchronization protocol.

vCalendar is an exchange format for personal scheduling information. It is applicable to a wide variety of calendaring and scheduling products and is useful in exchanging information across a broad range of transport methods. A number of vendors have adopted the specification because it allows their products to exchange calendaring and scheduling information. vCalendar is an open specification based on industry standards such as the x/Open and XAPIA Calendaring and Scheduling API (CSA), the ISO 8601 international date and time standard and the related MIME email standards. The vCalendar format utilizes data normally stored within a calendaring and scheduling application, facilitating the cross platform exchange of information about items such as events and to-do's. An event is a calendaring and scheduling entity that represents a designated amount of time on a calendar. A to-do is a calendaring and scheduling entity that represents an action item or assignment. For instance, it may be an item of work assigned to an individual.

vCard automates the exchange of personal information typically found on a traditional business card. vCard is used in applications such as Internet mail, voice mail, Web browsers, telephony applications, call centers, video conferencing, PIMs (Personal Information Managers), PDAs (Personal Data Assistants), pagers, fax, office equipment, and smart cards. In addition to text, vCard information may include elements like pictures, company logos, live Web addresses, and so on.

As these examples show, there have been lots of efforts to build systems that can synchronize booking systems. A common problem with all of these existing solutions is that they do not provide common semantics for different systems. For example, if an entry is tentative, different systems may interpret it in different ways.

Another problem is that booking systems have multiple different and usually quite complex user interfaces. If a customer wants to both make an appointment with a dentist and book a taxi to take him or her there, the customer needs to enter all the booking information to both booking systems in different ways.

One more problem is that it becomes challenging to manage client replies, if a client has been given a number of questions. For example, it makes sense to use SMS text messages to ask client which option he or she chooses, because in many countries, like in Finland, it is very common to communicate with SMS text messages and they create revenues to operators. However, if a client replies to several inquiries by sending a number of text messages, it can be troublesome to find out, which answer corresponds to a certain question because the reply does not automatically include a reference to the question. Say, a service asks a client if he or she wants to reserve—in addition to a flight ticket—also a taxi and a hotel room, and the client replies "yes" to one question but "no" to the other, the service does not necessarily know which offer the client has accepted.

Terminal devices, such as mobile terminals are used for making payments. Examples of mobile terminals are mobile phones and smart phones utilizing communication and connections according to e.g. 3G or LTE standards for voice calls and data transfer. An example of making payments is purchasing soft drinks from an automatic vending machine. A phone number is printed on the automatic vending machine. To make a purchase, the user calls this phone number, and accordingly a purchase is made and he/she receives the soft drink from the vending machine. The price for the soft drink is debited on the mobile subscription invoice together with other subscription related fees (such as a monthly fee, call fees, data transfer fees etc.). The disadvantage of such a solution is that the phone number to call is typically a special service phone number which for many subscriptions have been disabled. A user having such a subscription is not able to utilize the mobile terminal for purchasing.

OBJECTIVE OF THE INVENTION

An objective of the invention is to eliminate the drawbacks referred above or at least significantly alleviate them. The invention enables new kind of value adding services that are essential especially for mobile services.

Another object presented herein is to provide a payment method and system utilizing a terminal device. The terminal device may be a mobile terminal utilizing a wireless communication interface.

In one aspect of the payment method a user is allowed to purchase a product from a service provider without being invoiced at the time of purchase and without physical or electronic monetary funds being at the time of purchase, but against the user providing his or her phone number to the service provider.

This allows a user to purchase a product even if he or she is not at that moment carrying money with him/her or having an electronic purse or account with sufficient monetary funds. The service is limited to products of reasonably low value, e.g. a soft drink, an article of a newspaper or magazine, a call to a service call number such as to a service provider telling someone's address or phone number. The upper limit of such a purchase could be for example 5 euros.

After the purchase, a message is being sent by the service provider or by a moderator to the user's phone number offering the user to set up an electronic purse. Alternatively, the user may be offered to open an account with the service provider. Setting up an electronic purse service may be regulated in certain countries. For example, within the European Union there is regulation by SEPA (Single Euro Payments Area). At the stage or setting up an electronic purse the user may be prompted to provide his/her name and home address. The user may additionally or alternatively be asked to provide e.g. bank identification information or other identification providing similar secure identification. This may be e.g. like the bank identification known in Finland by the name Tupas.

In the payment method the user is accordingly offered a first purchase on credit upon providing his/her phone number. The phone number (i.e., subscription) may be of a kind that allows receiving messages, e.g. text messages such as SMS (Short Message Service) or push messages being sent over a packet data connection. The phone number may be a mobile phone number that enables receiving messages, e.g. text messages such as SMS (Short Message Service) or push messages being sent over a packet data connection.

As a second step a message is sent to the phone number offering to open an electronic purse or account.

As a third step, after the user having opened an electronic purse or account, the user is offered to transfer money/monetary funds to the electronic purse or account. This step may also be done by sending the offer to the user's phone number and allowing the user to respond by providing a credit card number or bank account number from which monetary funds may be transferred to the electronic purse or service provider account. At the same time or in a separate message the user would provide the amount of monetary funds (e.g. the amount of money in euros or US dollars) to transfer to the electronic purse or service provider account. The money transfer can take place after the service provider or the moderator providing the user with alternative amounts of funds and the user responding by selecting one of the alternatives. This is in order to make transferring funds to the electronic purse or account very simple for the user.

Thereafter, the user's electronic purse or account may be debited to the amount of the cost of the product. Alternatively, the service provider may offer the first purchase for free and only debit for the future purchases following thereafter.

For future purchases the service provider or moderator would always first check that there are sufficient funds in the electronic purse or account to cover the cost of a product.

Only the first purchase is provided on credit in order to make it fast and simple for the user. Accordingly, this payment method is herein referred to as the "zero click" payment method. This name refers to the fact that user can make a first purchase without inputting anything on his/her terminal device, such as a telephone, mobile telephone, tablet or other portable device that can use a phone number. The user only provides his/her phone number for the first purchase. The service provider thus takes a risk on the first purchase. If the user never opens up an electronic purse or account and transfers money to it, the service provider makes a loss for the sale. There may be a check mechanism to prevent the user from buying again against credit against the same phone number. Upon the first purchase, the user's phone number is stored into a memory that can be accessed by the service provider and/or the moderator. If the user tries to purchase again against credit using the same phone number as before, this is prevented and the user is rather sent a message being offered to set up an electronic purse or account. Accordingly, such electronic purse messages may be sent to the user several times. First, quite soon after the first purchase, and then at predetermined intervals a predetermined number of times. And also any time the user tries to make another credit based purchase after the first purchase.

The zero click payment method may be used in connection with automatic vending machines, in buying products from an internet site, in buying products from a physical shop or in connection with other services. In connection with vending machines the user would provide his/her phone number to the vending machine and then get the product from the automatic vending machine. An example of an internet site service, could be a magazine or newspaper providing short versions of articles for free. If the user wants to read the whole article he/she has to pay for the article. In this case the user would provide his/her phone number and be allowed access to the article against credit the first time. Regarding buying from a physical shop, there could be provided a machine or display in the shop with which the user can input his/her phone number and be considered paid for the product against providing his/her phone number. An example of another service where the zero click payment method can be used is calling a phone service number that normally costs a certain amount per time used. Yet another example of another service where the zero click payment method can be used is ordering of delivery of a post package. All of these and other services could be used with the zero click payment method where i. the user first gets a product or service against providing his/her phone number,
ii. the user is then (at a later point after having already received the product or service) being sent a message to the phone number prompting the user to open an electronic purse or account, after which
iii. the user is prompted to transfer monetary funds to the electronic purse or account. This can also be done by sending a message to the user prompting money transfer. The money transfer can be made by suggesting a limited number (e.g. four) of alternative amounts of money, and the user responding by selecting one of the alternatives.

The service provider then gets paid for the product or service, and the user now has an electronic purse or account set up for possible future purchases.

Another object herein is to provide a service provider apparatus offering purchase of products or services using the payment method provided herein, i.e., the zero click payment method.

The service provider apparatus comprising information on at least one product or service that can be purchased by a user, a user interface to be used by a user for providing a phone number to the apparatus, wherein the apparatus further comprises at least one processor, and at least one memory including computer program code, the at least one memory and the computer program code co-operating with the at least one processor, to cause the apparatus to provide the user with the product or service, and
transmit or cause transmission of a message to the phone number suggesting to the user to open an electronic purse or account to be used for debiting for the product or service and/or future products or services.

In an embodiment the service provider apparatus comprises a communication module for communication with external devices. The communication module may be used for transmitting the message to the phone number suggesting to the user to open the electronic purse or account. Alternatively or additionally the communication module may be used for communicating with a service provider or a moderator and provide the user's phone number to the service provider or moderator. The service provider or moderator may then transmit the message to the phone number suggesting to the user to open an electronic purse or account to be used for debiting for the product or service and/or future products or services.

Herein is provided a payment method for payment of a product or service purchased from a service provider apparatus comprising enabling a user to input a phone number to the apparatus,
providing the product or service to the user, and
transmitting or causing transmission of a message to the phone number suggesting to the user to open an electronic purse or account to be used for debiting for the product or service and/or future products or services.

In an aspect the service provider apparatus is an automatic vending machine comprising at least one of a user interface (UI) or machine-to-machine-interface (MMI). The user interface enables the user (also referred to as client) to type in an address of a terminal device, which to contact, and information on the product the user desires to purchase. The MMI may comprise a short range radio frequency interface, such as RF ID technology interface or NFC (Near Field Communication) interface, or Bluetooth or WiFi/WLAN or similar interface. Alternatively, the MMI may comprise a code, for example a bar code or QR code that may be read by a camera or electronic reader on the terminal device.

In one embodiment the UI comprises a set of keys, a touch screen or a voice recognition interface with at least a microphone and voice recognition software and/or hardware in order to recognize speech of a user. The user is able to use the UI to input an address of a terminal device, for example a phone number, email address or IP address. In a further embodiment the user is able to input information on the product to purchase. This information could be a code, for example a numeric or alphanumeric code that identifies the particular product the user desires to purchase.

In a further embodiment, once the user has opened an electronic purse or account, this electronic purse or account can be contacted or accessed e.g. utilizing the internet, an IP connection, WiFi/WLAN, a mobile communication network. Accordingly, the electronic purse or account can be located in the cloud so to say. The electronic purse or account comprises money or monetary funds (such as an amount in a currency, e.g. US dollars or euros, or in a digital currency such as bitcoins). The monetary funds could also be an acceptance by the user to debit his/her credit cards as in the well-known PayPal service.

In one embodiment a link is created between the electronic purse or account and the terminal device, or address of the terminal device. When the user later purchases (after the first purchase) a product from the automatic vending machine, the automatic vending machine charges the cost for the purchased product from the user's electronic purse or account by utilizing the address of the terminal device. This enables the user to make future purchases from the automatic vending machine as long as there are sufficient funds in the user's (i.e., client's) electronic purse or account.

In another embodiment, in future purchases the automatic vending machine first sends a message, or causes a message to be sent by a mediator, to the user's (client) terminal device before it is allowed to charge for the product, and thus before completing the purchase. Alternatively, the message is sent by a service provider owning, representing or maintaining the vending machine. In this case the message could physically be sent from an equipment owned, maintained, controlled by or rented by the service provider. This could be a text message, email message, voice message or a push-type data message that is sent via or from a mediator in a similar manner as will be described herein to which the user is allowed to respond. Once the user responds in a manner indicated as approval in the message, the purchase in completed and the user receives the product from the vending machine.

In one embodiment the machine-to-machine-interface (MMI) comprises a short range radio frequency interface, such as RF ID technology interface or NFC (Near Field Communication) interface, or Bluetooth or WiFi/WLAN or similar interface. Alternatively, the MMI may comprise a code, for example a bar code or QR code that may be read by a camera or electronic reader on the terminal device.

In an embodiment, there is provided a QR code (Quick Response code) on or close to the product that is offered for purchase from the automatic vending machine. The terminal device comprises equipment to read a QR code, e.g. a camera and software enabling reading the QR code. This could be a camera and an application (an app) on a smart phone. The QR code identifies the product. Further the QR code may include information on the price of the product. The QR code may include a link to the automatic vending machine. The QR code may include a link to an electronic purse or account of the automatic vending machine or of a service provider owning, representing or maintaining the vending machine. Accordingly, for future purchases (after the first purchase) the user can use the terminal device to read the QR code and obtain all or some of the before mentioned information. The user may allow charging his/her electronic purse or account to move funds corresponding to the price of the product from the user's electronic purse or account to the electronic purse or account of the automatic vending machine or of a service provider owning, representing or maintaining the vending machine. Once the product is paid for, the user obtains the product from the vending machine.

In an embodiment for making future purchases (after the first purchase) the automatic vending machine first sends a message, or causes a message to be sent by the mediator, to the user's terminal device before it is allowed to charge for the product, and thus before completing the purchase. Alternatively, the message is sent by a service provider owning, representing or maintaining the vending machine. In this case the message could physically be sent from an equipment owned, maintained, controlled by or rented by the service provider. This could be a text message, email message, voice message or a push-type data message that is sent via or from a mediator in a similar manner as will be described herein to which the user is allowed to respond. Once the user responds in a manner indicated as approval in the message, the purchase in completed and the user receives the product from the vending machine.

In another embodiment, instead of using a QR code the above mentioned information (product information, price, vending machine identification and information to an electronic purse or account of the vending machine or service provider) is transferred utilizing RF ID technology. One example of RF ID technology is NFC (Near Field Communication). In such an embodiment there is provided an RF ID tag on the vending machine, and the terminal device comprises an RF ID reader that is used to read the information from the tag, and then proceed in a similar manner to complete the payment as with the QR code. Alternative technologies could be other short range wireless technologies such as Bluetooth, WiFi, ZigBee etc.

It is a further object of the invention to provide a method and system capable of making booking type transactions involving at least one service provider and a plurality of users who are each communicating with a mobile telephone capable of receiving and sending short text messages.

It is a further object of the invention to provide a method and system capable of making booking type transactions between a plurality of service providers and a plurality of users who are each communicating with a mobile telephone capable of receiving and sending short text messages.

BRIEF DESCRIPTION OF THE DRAWINGS

In the following section, the invention will be described in detail by the aid of a few examples of its embodiments, in which.

DESCRIPTION OF THE INVENTION

Figure 1:
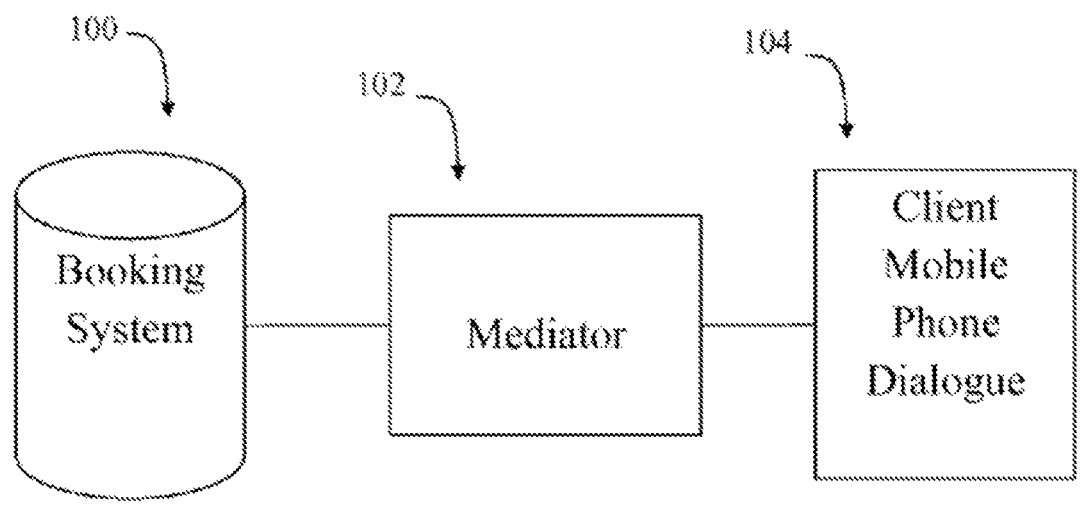
FIG. 1 represents one advantageous system in accordance with the invention.

The invention relates to exchanging and synchronizing information between booking systems and user terminal devices. The services may be for example booking appointments for health services; booking travel reservations for hotels, airlines, and rental cars; booking tickets for venues; booking appointments for vehicle maintenance; booking maintenance for apartments; and so on.

The booking system in accordance with the invention comprises at least one service provider booking system; at least one service provider; a mediator; a client; at least one client terminal device that can be a mobile device capable of receiving text messages, and that includes a dialogue; and telecommunication connections that are used to connect the service provider booking systems, the service providers, the mediator and the client terminal device to one another.

The service providers are those with whom clients want to make appointments, reservations, or other bookings and comprise the resources for the booking system to allocate. Service providers conduct business through service provider booking services. As used in this application, the mediator is a network based service available to the service provider booking services over the network that provides additional semantics, translation and synchronization services needed for communication of the information needed for a client to complete a transaction with a service provider. The service provider booking services and the mediator are preferably applications operating on network servers such as the Internet or a private Intranet. In general, a system will comprise a plurality of service providers and service provider booking systems (implementing service provider booking services), but it is possible to have a simple booking system for only one service provider in which case the mediator and service provider could be tightly integrated into a single application.

Clients preferably include clients communicating on mobile telephones capable of receiving short text messages, such as Short Message Service (SMS) messages. Of course, a system that is capable of handling SMS messages will also handle other clients with greater capabilities. The mediator preferably communicates with mobile telephone clients through an SMS gateway, such as are operated by mobile telephone providers and are well known today. The mediator communicates with clients using dialogues. Dialogues are short messages which present information to the client and allow a simple reply. Dialogues preferably provide users with simple choices such as yes/no or to allow a selection from an ordered list. Dialogues can also be one way, such as to acknowledge a reservation. A transaction may typically involve a sequence of dialogues each involving a simple response. Dialogues involve asynchronous communication by messages. The system as described makes it possible to coordinate bookings among different service provider systems in order to fill a client's need, for example coordination of an airline booking with transportation to the airport.

FIG. 1 is a diagram of the simplest system comprising a single service provider booking system 100 for a single service provider, a mediator 102 communicating with the service provider over a network and a user with a mobile phone having a dialogue entered thereon.

Figure 2:
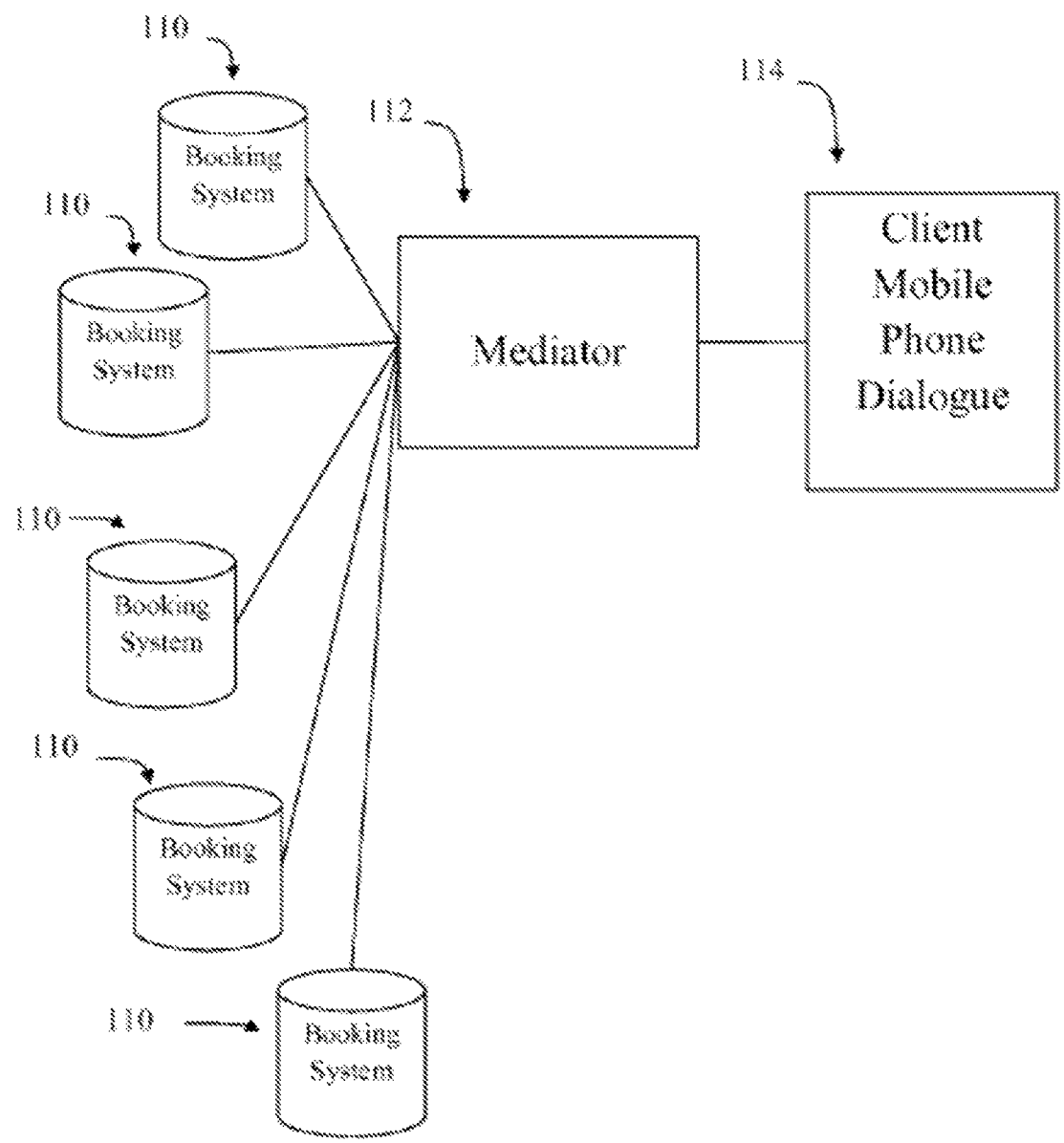
FIG. 2 represents a second advantageous system in accordance with the invention.

FIG. 2 shows a plurality of service provider booking systems communicating with a mediator over a network.

Figure 3:
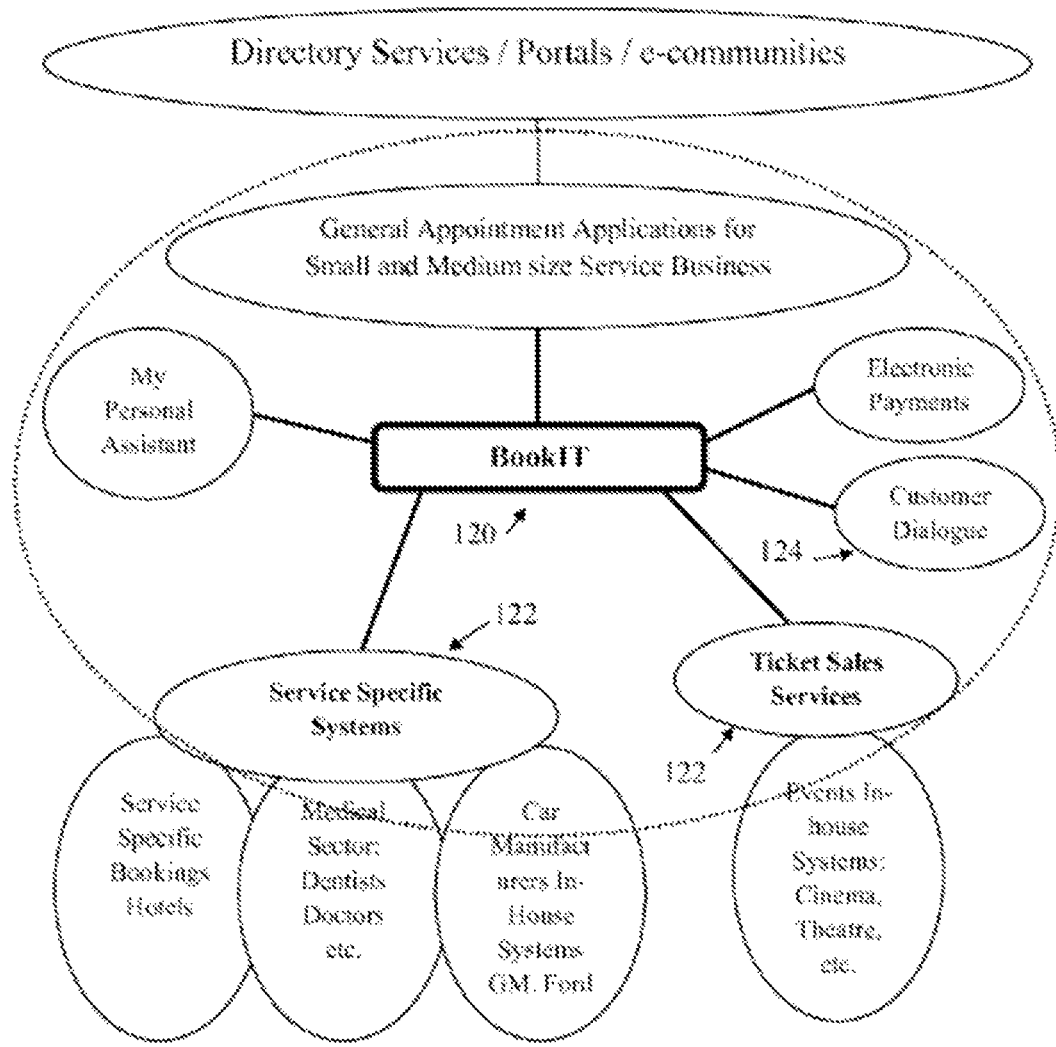
FIG. 3 represents a third advantageous system in accordance with the invention.

FIG. 3 shows a mediator named BookIT communicating with various service provider systems and users with telephone devices communicating dialogues.

A reason based customer dialogue is a desirable improvement from the client's point of view, because service providers can create their own dialogues in connection with each booking event. A dialogue is closely related to a certain booking situation. It becomes active automatically at the right moment, or the client can activate the dialogue as needed, or another entity in the system can send a message to the dialogue to activate it. The dialogue then sends an inquiry to another entity in the system or informs the client and possibly inquires client's choices. By means of this kind of dialogue, the client can make reservations in several booking systems using only one user interface. The dialogue connects to remote booking systems e.g. through the Internet or even mobile networks.

A mediator service can be capable of transmitting booking information between service provider booking systems. For example, after a booking is entered into an airline booking system, a taxi booking system can offer the client a lift to the airport. In this application, a booking is an allocation of a single resource (either the airline booking or the taxi in the previous example), while a reservation is the union of the bookings for all of the resources for the same event (the airline booking plus the taxi booking in the previous example). The dialogue between the client, the mediator and the booking systems as well as stored customer profiles ensure that the client gets the reason based service he or she needs, not intrusive advertising.

A client can make reservations as well as confirm, change, and cancel them using many kinds of communication means, including but not limited to the Internet, e-mail, and mobile terminals. The client can also synchronize a calendar provided by the mediator or a service provider with a calendar in a terminal device using mediator's synchronization functions.

A service provider can remind clients to make reservations on a regular basis and thus increase customer loyalty. A mediator can help service providers to bring their booking systems together to provide more comprehensive services without extending their businesses unnecessarily. Because of internationalization, the mediator is able to support for example many languages, time zones, currencies, and data formats.

The system, including at least a dialogue, a mediator, a service provider, and a service provider booking system, can be on one of the following levels: 1. There is a predetermined set of dialogues in the system. Their content and the possible choices are set in advance. For example, if a client books a flight, a dialogue always offers certain other bookings. Client's prior actions are not taken into consideration. 2. There is an unlimited number of dynamic or "intelligent" dialogues that are based on, for instance, a profile that a client has created himself or herself, usage history records, and client's location. Simple logic supports decisions. It is a low-level expert system. 3. The system is able to make decisions by itself and to support client's decision making. On this level, a dialogue may include a high-level expert system. It can act as an agent and negotiate with several service providers to get the best offer without client's direct involvement.

In one preferred embodiment of the method, a client books a service from a service provider. The booking may be carried out using a terminal that is connected to the mediator service. First, the client connects to the mediator service using a dialogue. The client inputs reservation inquiry to the dialogue that sends the inquiry to the mediator. The mediator inquires possible reservations from service provider's information system using concepts and terminology that those services are able to interpret. The inquiry is based on client's preferences. The client discloses some preferences that are related to the specific booking when he or she inputs reservation inquiry to the dialogue. In addition, the dialogue and the mediator service may have stored client's general preferences and use them so that the client does not need to input all the preferences each time.

Managing the inquiry and bookings is based on sophisticated state models. Each booking involves several phases that are described by states that track its status through its life cycle. For example, when the mediator has inquired about a reservation from a service provider, the corresponding entry in each system has a state that the booking is pending but not confirmed. If the systems do not have common understanding what a certain state means, the mediator translates them. A preferred booking process including the phases and states is described in Example 1.

In addition to inquiring reservations from the service provider, the mediator is able to synchronize bookings in several service providers' systems. The synchronization is based on rules specified in the mediator service. For example, a rule can be that "if a client inquires booking for an airline ticket, inquire also bookings for taxis to the airport." Therefore, an inquiry from the client may be multiplied in the mediator service resulting a number of inquiries. The service providers answer to the mediator if they are able to provide requested service and they may add some additional information, like on seats or timing. The mediator combines gathered information and sends it to the dialogue that shows a simple list of options to the client. For example, the dialogue may show three options for a flight and ask if the client also wants to reserve a taxi that is actually already tentatively booked by the mediator. The client makes his or her decision by choosing the options from the simple list of alternatives. The dialogue sends information on client's choice to the mediator that confirms the bookings in accordance with client's choices and cancels the unnecessary reservations.

Figure 4:
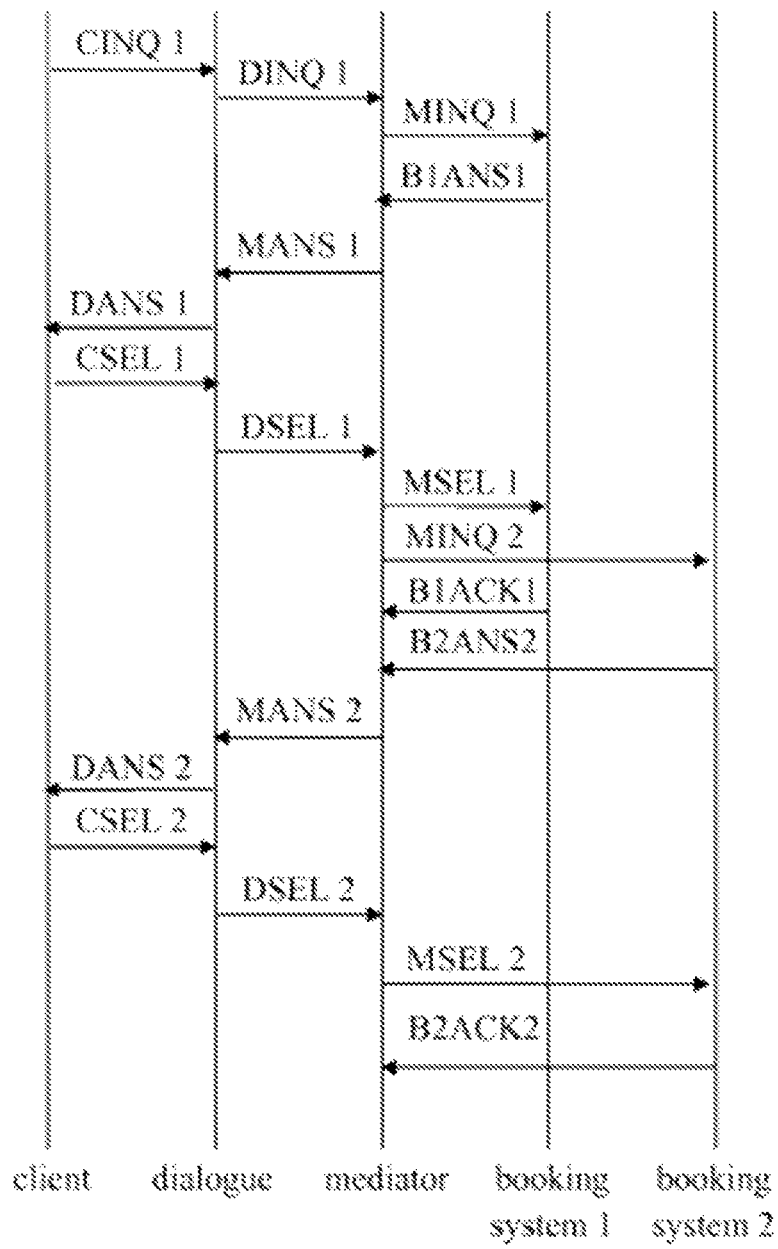
FIG. 4 is one advantageous example of a sequence diagram representing messages transmitted within a system in accordance with the invention.

FIG. 4 shows a sequence diagram of an inquiry CINQ1 originated by a client using a dialogue DINQ1 sent to the mediator. The mediator initiates the inquiry MINQ1 which corresponds to CINQ1 and DINQ1 to booking system 1 a service provider booking system. Ultimately an answer DANS1 gets back to the client offering a choice which is responded to with a selection CSEL1 resulting in a booking by the client on booking system 1. The mediator recognizes the potential need for a complementary service from booking service 2 and initiates an inquiry, MINQ2, to booking system 2, which ultimately results in a proposal including several choices, DANS2, returned to the client from which a selection, CSEL2, is made, resulting in a complementary booking on booking system 2.

The bookings can be done in other means as well, for instance, by calling the service provider with a telephone or by visiting on site the service provider's office. In that case the service provider may inform the mediator about client's bookings so that the mediator can inform the client on other options. For example, a dentist could tell the mediator that the client has booked an appointment so that the mediator may offer to book a taxi also.

Figure 5:
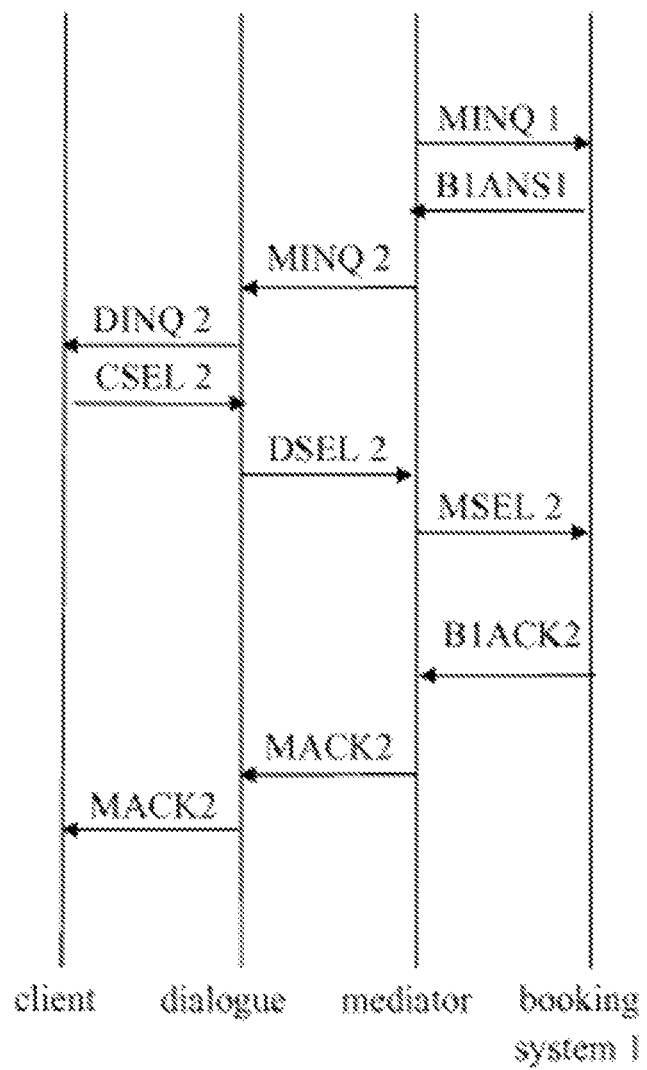
FIG. 5 is a second advantageous example of a sequence diagram representing messages transmitted within a system in accordance with the invention.

Also, it is possible to add a reminder to the mediator service so that the mediator asks at certain time if the client wants to make a new booking. For instance, the mediator can send a notice to the client that it has been a year since the client last had an appointment with his or her dentist and ask if the client wants to make a new appointment. This notice can already include a few options for the appointment. The mediator has checked the client's calendar if he or she has allowed that so that the given options are convenient for the client. The dialogue shows the options in a simple and handy way. The client needs only to choose which option is the best for him or her or whether he or she wants to get new options or postpone the booking. FIG. 5 is a time sequence chart for such a situation where the original inquiry, MINQ1, was initiated by the mediator.

EXAMPLE 1

A Preferred Booking System

A preferred booking system according to the invention, is described below in terms of a system named BookIt.

BookIT is designed to interface between service provider booking systems and other parties over a network such as the Internet, and to end user clients equipped with mobile phones capable of receiving text messages. The former is preferably accomplished with a generic XML interface. BookIT supports vCard and vCalendar standards since they are used by all major booking and calendar systems.

BookIT communicates with mobile phone users using Short Message Service (SMS) via an SMS Gateway for asynchronous communication. BookIT uses the novel Dynamic Dialogue Matrix (DDM) for secure transfer and mapping of the SMS messages. The DDM is described further below.

A clear distinction needs to be made between a service provider booking process and BookIT Process. The former covers the standard booking only with time and resource reservation. The latter consists of booking, work, and financing. Both processes end to the same point. The BookIT Process consists of seven phases as follows:

Phases (Status Handling)

The phases make a bond (rubber band) between the resources. In each of the BookIT Process' phases the data related to the booking will be amended to reflect the needs of the phase in question. For the statuses and values please see the underneath table.

The phases are described in more detail in the following discussion.

1. Filing

Filing means initialization of a BookIT Process and a booking process. As a result of the initialization an entry is inserted in the database w/basic information. It will not appear in a calendar since there is no scheduling information. It can be displayed in a separate task list of the owner as an open task.

2. Requesting

In the Requesting phase a booking request is sent to the resources required for the previously filed task. Since there is no scheduling, which in most cases will be essential, this phase may be executed together with the Scheduling phase.

3. Scheduling

Schedule is given to the owner and the resources. As a part and a result of the Scheduling the following data is needed: a suggested start-time (ISO time-stamp w/time zone) b suggested start-location (coordinates) c suggested end-time (ISO time-stamp w/time zone) d suggested end-location (coordinates)

4. Confirming

Time and location as it is accepted by the resources that have accepted. Data related to this phase: an accepted start-time (ISO time-stamp w/time zone) b accepted start-location (coordinates) c accepted end-time (ISO time-stamp w/time zone) d accepted end-location (coordinates)

By default the data is copied from the Planning phase.

In practice, if planned time is not needed, the same data structures can be used for this and status indicates the actual meaning of the data.

5. Working

The resources perform the booked task. Data related to this phase consists of different attributes and their values, which are related to the actual task. In addition, following static structures are needed: an actual start-time (ISO time-stamp w/time zone) b actual start-location (coordinates) c actual end-time (ISO time-stamp w/time zone) d actual end-location (coordinates) e products used, extras, mileage, . . . .

By default the data is copied from the Confirming phase.

6. Accounting

At this point all data stored in the data structures on previous phases is analyzed and processed for invoicing purposes.

Data related to this phase: Accounting data. To be defined separately.

7. Completing

The task has been completed. From the whole BookIT process point of view it is irrelevant whether the task succeeded or not. It is relevant to the Accounting phase, in which the financial actions to the organizer are handled. In this phase, housekeeping (database contents; temporary files, . . . ) is made in order to complete the BookIT Process.

The following table shows data available in each phase. Booking phase is in italics.

| | | | | | | |
|---|---|---|---|---|---|---|
| Filing | X | | | | | ☒ |
| Requesting | X | X | | | | ☒ |
| Scheduling | X | X | X | | | ☒ |
| Confirming | X | X | X | X | | ☒ |
| Working | X | X | X | X | X | ☒ |

-continued

| | | | | | | | |
|---|---|---|---|---|---|---|---|
| Accounting | X | X | X | X | X | X | |
| Completing | X | X | X | X | X | X | X |
| Phase/Data | Identifying | Resources | Suggested time | Accepted time | Task's work related | Accounting | Closing |

Phase Statuses, Values, and Transitions

The following table describes the phases, their statuses, and values along with transition to next logical phase based on the values gotten. In addition, corresponding vCalendar statuses are shown when applicable.

| Phase | Satus | Next Phase | vEvent | vTodo |
|---|---|---|---|---|
| Filing | | Requesting | | |
| Requesting | | Scheduling | Sent | Sent |
| Scheduling | Pending | Confirming | Needs action | Needs action |
| Scheduling | Scheduled | Confirming | Needs action | Needs action |
| Scheduling | Re-scheduled | Confirming | Needs action | Needs action |
| Confirming | Accepted | Working | Confirmed | Accepted |
| Confirming | Declined | Accounting | Declined | Declined |
| Confirming | Tentative | Accounting | Tentative | |
| Confirming | Delegated | Requesting | Delegated | Delegated |

Confirming the (Whole) Reservation

In order for the whole Reservation to be successful, all resources, which accepted the reservation, need to have the same scheduling. In addition, there will resources in different roles and data related to the working phase may vary even greatly.

The different statuses of the whole reservation are: a "NoReplies" (0) for "No-one hasn't replied to the request made by the organizer" b "NoDeclines" (1) for "Not all invitees have replied yet. The ones who have replied have accepted" c "AllAccepts" (2) for "all invitees have confirmed" d "SomeDeclines" (3) for "Some of the invitees have declined" e "AllDeclines" (4) for "All of the invitees have declined".

The following decision table helps in evaluating the status of the whole booking. "Maybe" means that this condition only does not incontestably specify true or false result.

| | Confirmations | | | | | | |
|---|---|---|---|---|---|---|---|
| Booking Status | No one answered | No one accepted | Some Accepted | All accepted | No one declined | Some declined | All declined |
| No Replies | True | Maybe | | | Maybe | | |
| No Declines | True | Maybe | Maybe | True | True | | |
| No Accepts | True | True | | | Maybe | Maybe | True |
| All Accepts | | | True | True | Maybe | | |
| Some Accepts | | | True | Maybe | Maybe | Maybe | |
| All Declines | | Maybe | | | | | True |
| Some Declines | | Maybe | Maybe | | | True | Maybe |

-continued

| Phase | Satus | Next Phase | vEvent | vTodo |
|---|---|---|---|---|
| Confirming | Re-scheduling requested | Accounting or Scheduling | | |
| Confirming | InProgress | Working | | |
| Working | InProgress | Working | | |
| Working | Delayed | Working | | |
| Working | Started | Working | | |
| Working | n % ready | Working | | |
| Working | Ready | Accounting | | |
| Accounting | | Completing | | |
| Completing | <Copied from phase before Accounting> | n/a | | |

Internal phases Paused, Re-started, and Canceled act as follows for all relevant phases at any point:

| | | |
|---|---|---|
| <Phase y> | Paused | <Status x> |
| <Phase y> | Re-started | <Status x> |
| <Phase y> | Cancelled | Accounting |

Figure 6:
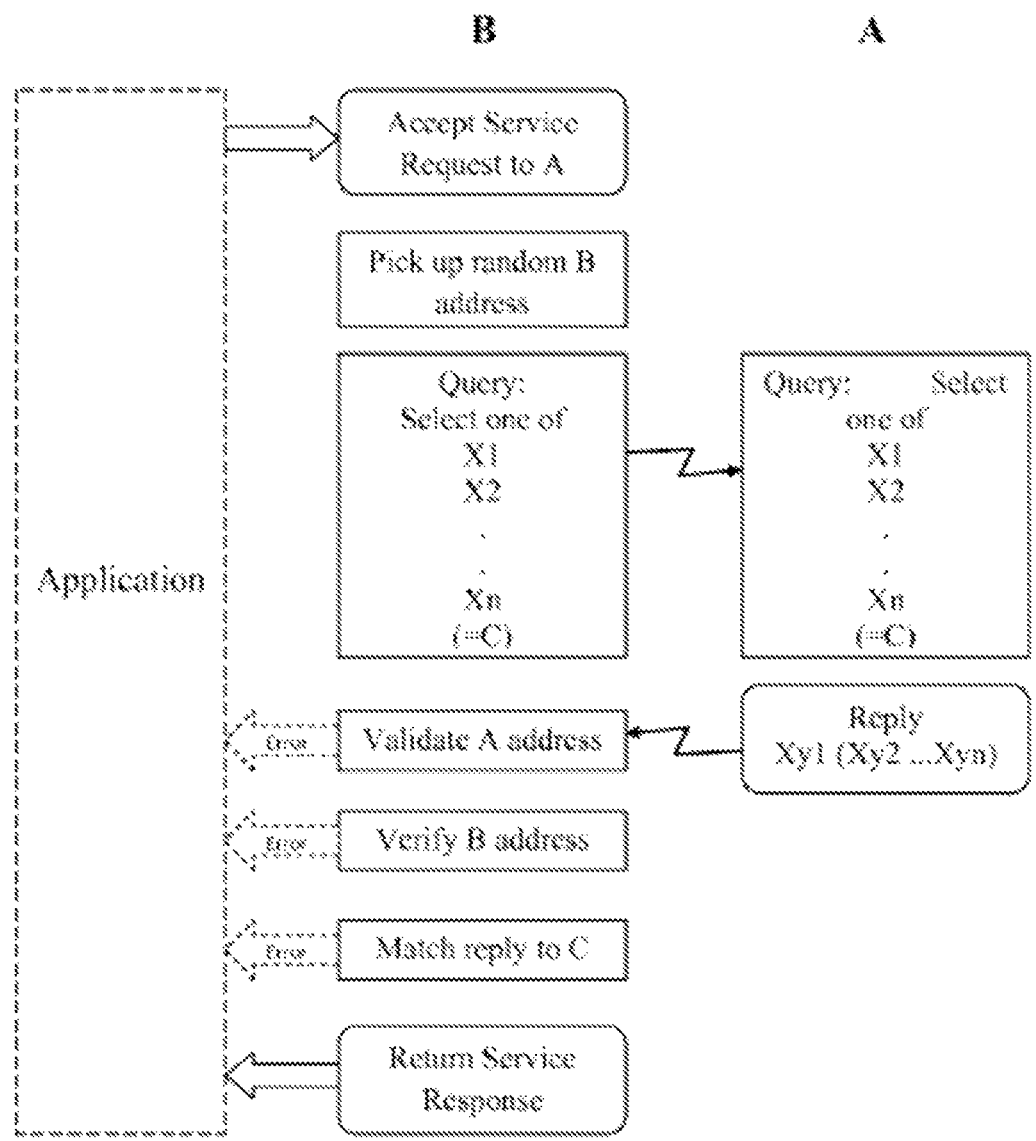
FIG. 6 shows an example of the dynamic dialog matrix applied to a query and reply according to the invention.

FIG. 6 shows the work flow transitions from phase to phase. For conditions, see the table above. Also, please note that Canceled Status always leads to Accounting.

Based on the information and decision table above the organizer/application has to make the decision of what to do with the reservation. That can be an automatic decision made by the system based on pre-set rules or made by the organizer manually.

One major problem solved by the invention is the challenge of managing client replies, when a client has been given a number of questions and the client is using SMS text messages or similar technology in which a reply does not automatically include an explicit reference to the inquiry. The invention solves this problem using dynamic dialog matrices. An inquiry always includes some kind of receiver's address or identification. In the SMS text message case that is so called B subscriber's number. On the other hand, sender's A subscriber's number or Calling Line Identity (CLI), or similar identification is also attached to each text message. Therefore the client or B subscriber is usually easily able to answer a message using mobile device's answer or reply function. If a mediator service that sends inquiries to a client, uses different A subscriber numbers in different inquires, it is possible to differentiate between answers based on which number the client is sending replies to. For example, if a mediator sends a client an inquiry "Do you need a taxi also?" using A subscriber number A1 and then inquiries "Do you need a hotel room?" from A subscriber number A2, client's reply to the first question goes to number A1 and the second answer goes to number A2. Using a dialog matrix, a mediator keeps track on inquires and answers. In the matrix, there is a column for each client and a row for each A subscriber number the mediator is using. Obviously, there could be a row for each client and correspondingly a column for each A subscriber number as well. After sending an inquiry from a certain A subscriber number to a client, the status and the reply is stored in the corresponding shell of the matrix. As a result, the mediator is able to find out whether the client has replied to a certain inquiry and what the answer was. Also, it is possible to use the matrix to collect information about clients' behavior and use it for example for marketing purposes. A mediator needs only a limited number of A subscriber numbers. A dialog matrix can also be used to find out which A subscriber numbers can be used when the next inquiry to a certain client is sent.

Figure 7:
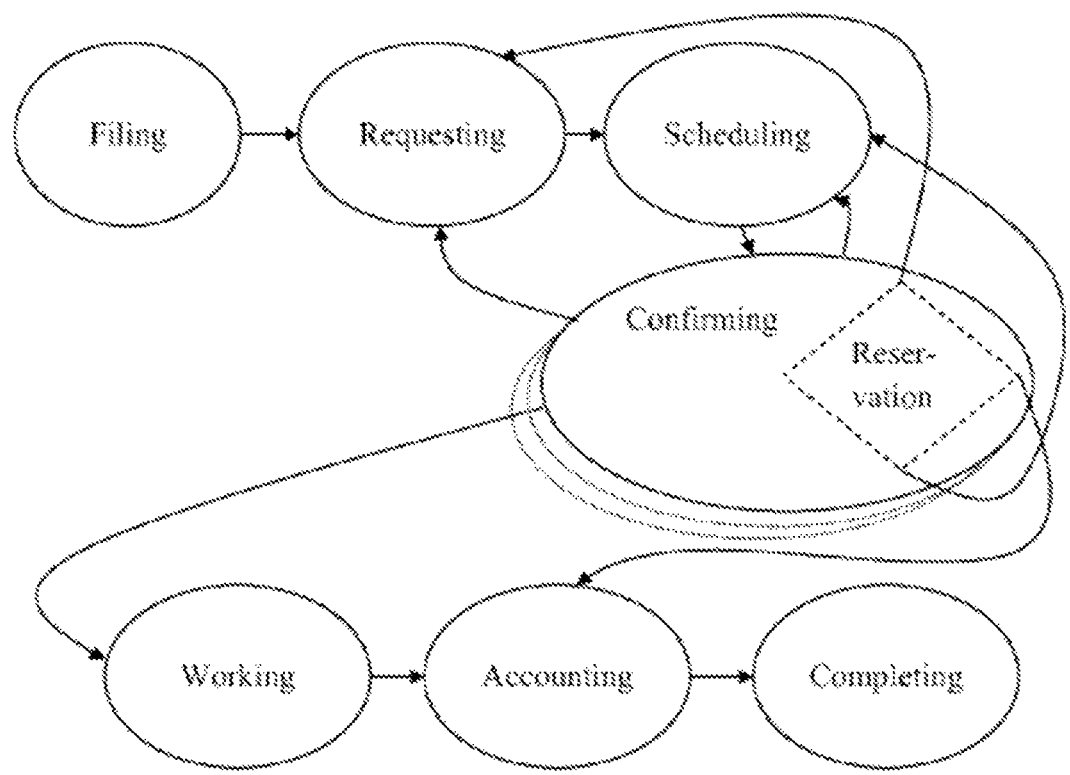
FIG. 7 shows the phases of the booking process in a preferred embodiment of the invention.

The use of the Dynamic Dialog Matrix as described above is illustrated in FIG. 7.

The Dynamic Dialog Matrix is also a powerful but very simple security measure for authenticating a mobile phone user who has only the capability of sending and receiving messages. The problem is for a service to confirm a sender's identity. One way to try to identify the user is to check the sender's address. Normally SMS, e-mail, and other alike messages have the sender's address attached. That address can be for example the sender's A-subscriber's number or Calling Line Identity (CLI), or e-mail address or IP address. However, it is quite easy to falsify a sender address. From the service provider's perspective, the downlink from a service provider to a user is usually relatively reliable and it is hard for others to capture or change messages, but the uplink from a user to a service provider is much more vulnerable and it is not too difficult to give a wrong sender's address. A well-known solution to the above problem is to use encryption technologies to secure the communications, public-key infrastructures (PKI) being good examples. For instance, a user device can be equipped with a microchip, a secure SIM card in GSM devices for example, to encrypt messages using the user's private key. Then the service provider can be sure that the message is from the user, if it can be decrypted using the user's public key. However, this solution requires special devices that are not very common, inexpensive, or standardized so far. Relying on such a solution restricts the number of potential users significantly.

Using the DDM provides a novel solution. When the service sends a request to the mobile phone user, each request contains a different, preferably randomly chosen, reply number. Thus an acceptable answer is only the one that is sent to the correct reply address.

EXAMPLE 2

Use of the Dynamic Dialogue Matrix

This simple example deals with securing tickets on a morning flight tomorrow. The system sends a series of questions as SMS messages requiring a short response. Each message is earmarked so that its response can be identified so the messages need not necessarily be sent or replied to in a particular sequence unless logic so demands (for instance, if the answer to one question affects the content of the next question).

A user whose phone number is ID=0418 979 813 has requested the ticket. The system sends the following requests as individual SMS messages:

Please choose one of the following departure times: 6:00 a.m., answer A 7:30 a.m., answer B 8:15 a.m., answer C. If none of these is OK, answer D. Sender: +358440844 027

Please choose ticket class: First class, answer A Business class, answer B Economy class, answer C Cheapest available, answer D Sender: +358440844 011

Please choose: Window seat, answer A Aisle seat, answer C Sender: +358440844 034

Please select the meal: Vegetarian, answer A Beef, answer B Chicken, answer C Sender: +358440844 003

The answers received from the customer to the preceding questions and several others were as follows: 'A' to question with ref.no +358 440 844 027 'D' to question with ref.no +358 440 844 011 'A' to question with ref.no +358 440 844 034 'B' to question with ref.no +358 440 844 003 'D' to question with ref.no +358 440 859 751 'A' to question with ref.no +358 440 844 277 'C' to question with ref.no +358 440 841 368

From this, the service provider can find out that the customer chose:
the first morning flight (=A),
cheapest available ticket (=D),
window seat (=A),
beef for meal (=B),
and etc.

It is important to note with the matrix the customer can answer the questions in any order, and can even fail to answer some questions. If these are relevant, the system can urge for an answer. If not, the system can proceed without this information.

Figure 8:
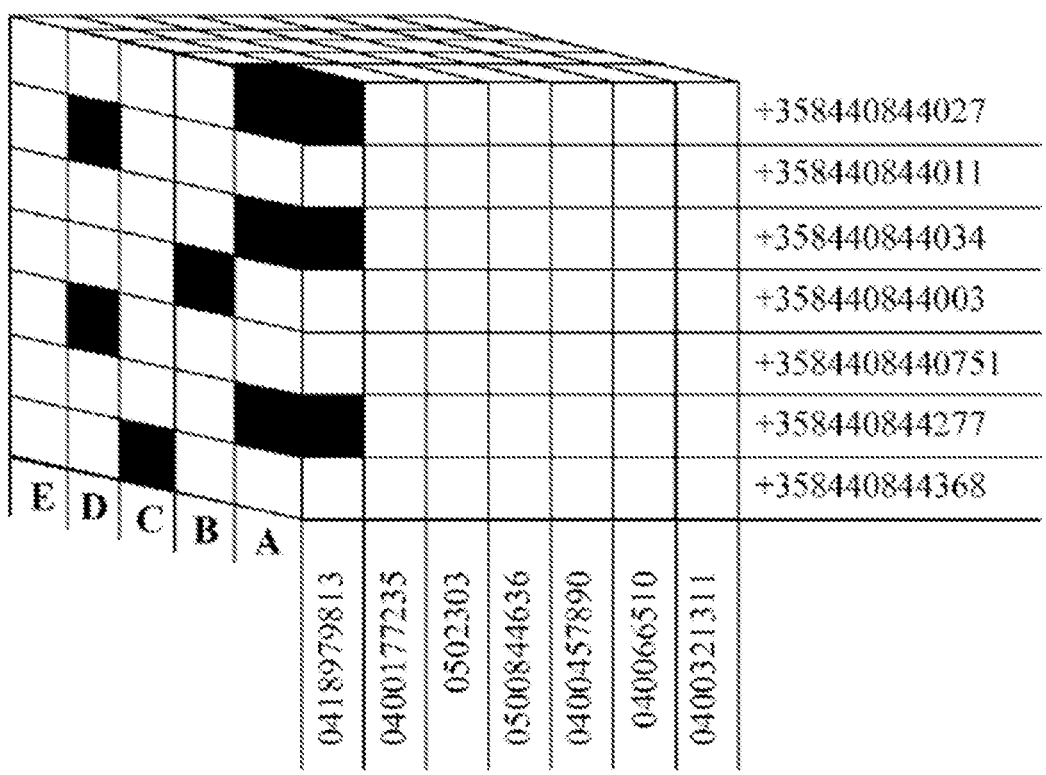
FIG. 8 shows a matrix diagram corresponding to Example 2, according to a preferred embodiment of the invention.

The above responses are shown on FIG. 8 as a three dimensional matrix with customer numbers plotted on the X-axis, reply numbers are plotted on the Y-axis and answers plotted on the Z-axis. Our user with phone number 0418 979 813 is the left most user along the X-axis. The answers are plotted along the Z-axis corresponding to the reply numbers on the Y-axis.

Additional security can be achieved using semantic analysis. In the matrix shells, there can be information about the inquiry and what kinds of answers are acceptable. If an answer does not meet the criteria, it is rejected. For example, if the service provider asks the user to tell how many items are ordered, and the user answers "yes", then apparently the user did not know what the question was and the message was not an answer for the inquiry.

It is also possible that the service provider is actually a mediator and the "real" service provider is somewhere else. In that case, only the mediator needs to have the matrix-based system and the actual service provider communicates with the mediator using either the mediator's matrix-system or other secure means like a crypto-channel. For example, a car sharing system could be implemented in the following way: cars are located randomly around a city. When a user needs a car, he or she sends a message to a mediator to ask where the nearest car is. The mediator sends a message telling the car's location. That reply comes from a random address y'. When the user reaches the car, he or she sends a message to y' telling that the rental period begins and asking the mediator to remotely release the car's locks. This message is relatively reliable, because it is sent to the address that the user only knows. Therefore it constitutes a valid reason to release the locks and start billing. The communication between mediator and the car, on the other hand, is invisible to the user and outsiders. The car can be equipped with special devices and therefore remote commands to release the locks etc. can be encrypted. Or, the communication between the car and the mediator could also be implemented using matrices. In either case, the mediator operates as a "firewall" between the user and the car disabling outsiders from unauthorized usage.

Figure 9:
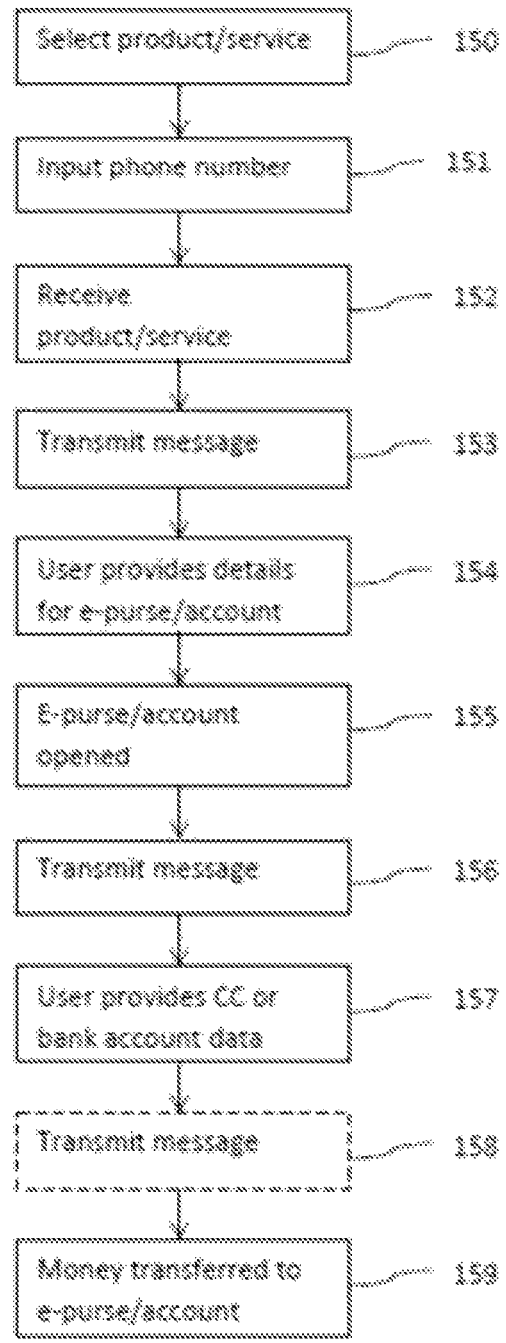
FIG. 9 illustrates a payment method that is referred to as the zero click payment method.

FIG. 9 illustrates a payment method that is referred to as the zero click payment method.

In the method a user is allowed to purchase a product from a service provider without being invoiced at the time of purchase and without physical or electronic monetary funds being at the time of purchase, but against the user providing his or her phone number to the service provider. Also no credit card is debited at this point and no credit card details are given either by the user at the time of purchase.

This is illustrated in FIG. 9 by the user first in step 150 selecting a product or a service that he or she desires to purchase. Thereafter the user is requested to give his/her phone number, which he/she inputs in step 151. Thereafter the user receives the product or service in step 152.

This allows a user to purchase a product even if he or she is not at that moment carrying money with him/her or having an electronic purse or account with sufficient monetary funds. The service is limited to products of reasonably low value, e.g. a soft drink, an article of a newspaper or magazine, a call to a service call number such as to a service provider telling someone's address or phone number. The upper limit of such a purchase could be for example 5€ or $5.

After the purchase, a message is being sent by the service provider or by a moderator to the user's phone number offering the user to set up an electronic purse (step 153). Alternatively, the user may be offered to open an account with the service provider. Setting up an electronic purse service may be regulated in certain countries. For example, within the European Union there is regulation by SEPA (Single Euro Payments Area). At step 153 when setting up an electronic purse the user may be prompted to provide his/her name and home address. The user may additionally or alternatively be asked to provide e.g. bank identification information or other identification providing similar secure identification. This may be e.g. like the bank identification known in Finland by the name Tupas.

In the payment method the user is accordingly offered a first purchase on credit upon providing his/her phone number. The phone number (i.e., a subscriber connection number) may be of a kind that allows receiving messages, e.g. text messages such as SMS (Short Message Service) or push messages being sent over a packet data connection. The phone number may be a mobile phone number that enables receiving messages, e.g. text messages such as SMS (Short Message Service) or push messages being sent over a packet data connection.

As a following step 153 in the zero click payment method a message is sent to the phone number offering to open an electronic purse or account. The user is allowed to respond to this message by providing the details needed (as stated above) for opening the electronic purse or account with the service provider. The user provides this information in step 154.

As a third step, after the user having opened an electronic purse or account in step 155, the user is offered to transfer money/monetary funds to the electronic purse or account. This step may also be performed by sending the offer to the user's phone number (step 156 in FIG. 9) and allowing the user to respond (in step 157) by providing a credit card number or bank account number from which monetary funds may be transferred to the electronic purse or service provider account. At the same time or in a separate message (step 159) the user would provide the amount of monetary funds (e.g. the amount of money in euros or US dollars) to transfer to the electronic purse or service provider account. The money transfer can take place after the service provider or the moderator providing (at step 158) the user with alternative amounts of funds (in a message sent to the user in step 158) and the user responding (in step 159) by selecting one of the alternatives. This is in order to make transferring funds to the electronic purse or account very simple for the user.

Thereafter, the user's electronic purse or account may be debited to the amount of the cost of the product. Alternatively, the service provider may offer the first purchase for free and only debit for future purchases following thereafter.

For future purchases the service provider or moderator would always first check that there are sufficient funds in the electronic purse or account to cover the cost of a product.

Only the first purchase is provided on credit in order to make it fast and simple for the user. Accordingly, this payment method is herein referred to as the "zero click" payment method. This name refers to the fact that user can make a first purchase without inputting any payment information. The user only provides his/her phone number for the first purchase. The service provider thus takes a risk on the first purchase. If the user never opens up an electronic purse or account and transfers money to it, the service provider makes a loss for the sale. There may be a check mechanism to prevent the user from buying again against credit using the same phone number. Upon the first purchase, the user's phone number is stored into a memory that can be accessed by the service provider and/or the moderator. If the user tries to purchase again against credit using the same phone number as before, this is prevented and the user is rather sent a message being offered to set up an electronic purse or account, similar as in steps 153-159 in FIG. 9. Accordingly, such electronic purse messages (of step 153) may be sent to the user several times. First, such a message is sent quite soon after the first purchase, and then after the purchase at predetermined intervals a predetermined number of times unless the user has opened an electronic purse already. And also any time the user tries to make another credit based purchase after the first purchase.

The zero click payment method may be used in connection with automatic vending machines, in buying products from an internet site, in buying products from a physical shop or in connection with other services. In connection with vending machines the user would provide his/her phone number to the vending machine and then get the product from the automatic vending machine. An example of a service at an internet site could be a magazine or newspaper providing short versions of articles for free. If the user wants to read the whole article he/she has to pay for the article. In this case the user would provide his/her phone number and be allowed access to the article against credit the first time. Such an article could be relatively cheap, cost e.g. $0.30 and a simple payment method such as the zero click payment method would make it easy for users to make such a purchase.

Regarding buying from a physical shop, there could be provided a machine or display in the shop with which the user can input his/her phone number and be considered paid for the product against providing his/her phone number. An example of another service where the zero click payment method can be used is calling a phone service number that normally costs a certain amount per time used. Yet another example of another service where the zero click payment method can be used is ordering of delivery of a post package.

All of these and other services could be used with the zero click payment method where
  i. the user first gets a product or service against providing his/her phone number (steps 150-152 in FIG. 9), For example the user inputs phone number 040123456 or +35840123456.
  ii. the user is then (at a later point after having already received the product or service) being sent a message (step 153) to the phone number (e.g. +35840123456) to prompting the user to open an electronic purse or account. For example, the service provider or mediator could sent a message to e.g. +35840123456 and include a sender's address +358440844002 with the following contents "Would you like to open an electronic purse number. If you do respond by sending your name and home address." The user sends a response including name and home address from his/her phone number +35840123456 to +358440844002. Thereafter the mediator could send a confirmation message e.g. from +358440844003 to +35840123456 stating "Thank you for opening an electronic purse. The purse number is 12345 and you may access it from phone number +35840123456." After this
  iii. the user is prompted to transfer monetary funds to the electronic purse or account. This can also be done by sending a message (step 156) to the user prompting money transfer. The money transfer can be made by suggesting (step 158) a limited number (e.g. four) of alternative amounts of money, and the user responding (step 159) by selecting one of the alternatives.

For example, the service provider or mediator could send a message to e.g. user address (here as an example a phone number) +35840123456 and include a sender's address +358440844001 with the following contents "Would you like to add money to your electronic purse number 12345. If you want to add $5 respond A, if $10 respond B, if $20 respond C, and if $50 respond D." The user sends a response C from his/her phone number +35840123456 to +358440844001 whereby $20 is transferred from the user's credit card or bank account to the electronic purse or account.

The service provider then gets paid for the product or service, and the user now has an electronic purse or account set up for possible future purchases.

Figure 10:
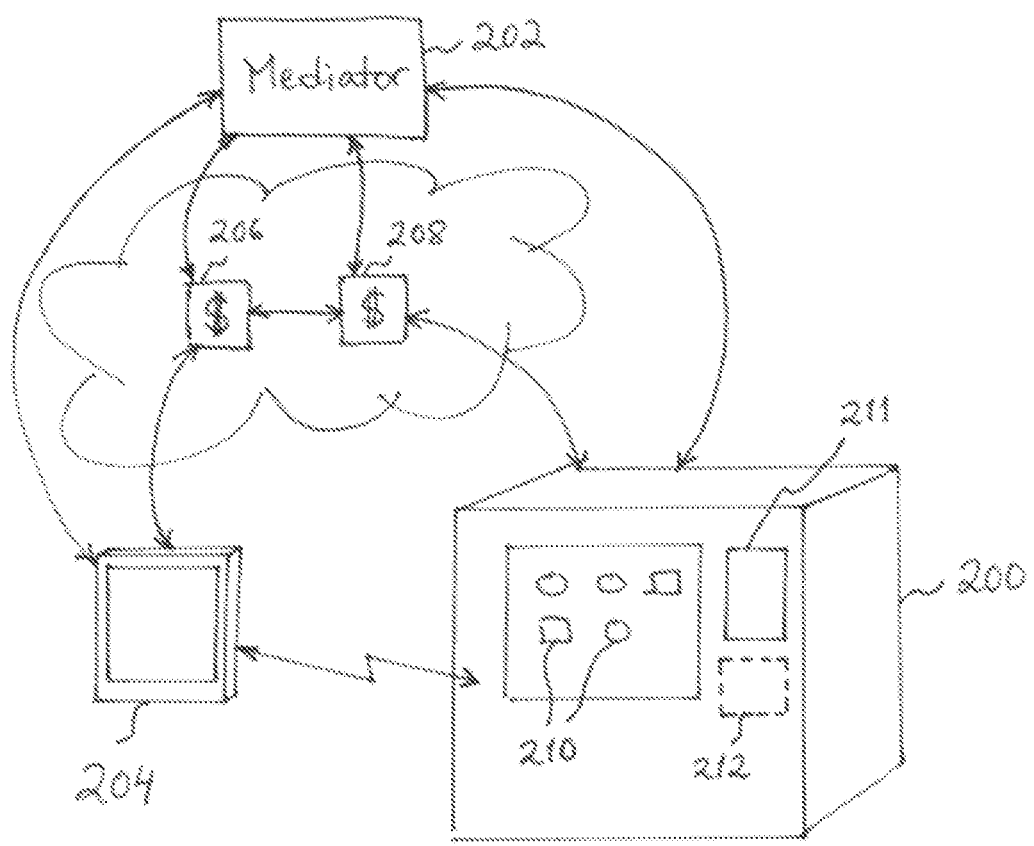
FIG. 10 shows a payment system and illustrates a payment method.

FIG. 10 discloses an embodiment of a payment system and illustrates a payment method. The system comprises a service provider apparatus 200 of which in the following an automatic vending machine is used as an example of such apparatus. The automatic vending machine can be provided with products 210 that users can purchase and obtain from the automatic vending machine 200. The automatic vending machine 200 can also be an automated storage where access is provided instead of acquiring a product. For example, there exists automated post boxes which have electronic locks. By providing a specific code or other access authentication (such as NFC, Near Field Communication) a door is opened at the automated storage. Accordingly, an automatic vending machine 200 is to be understood broadly as providing access to physical objects such as soft drinks, refrigerated or dry food, DVDs, or downloading a file, such as video, from the machine, or accessing a space such as a post office box. An automatic vending machine 200 will be described in more detail in FIG. 11.

The automatic vending machine can also be used or accessed with the help of a terminal device 204. The terminal device 204 may be a mobile terminal utilizing a wireless communication interface. Examples of mobile terminals are mobile phones and smart phones utilizing communication and connections according to e.g. 3G or LTE standards for voice calls and data transfer. A terminal device 204 will be described in more detail in FIG. 12.

In an aspect of the payment system and method the automatic vending machine 200 comprises at least one of a user interface (UI) 211 or machine-to-machine-interface (MMI) 212. The user interface 211 enables the user (client) to type in a phone number or an address of a terminal device, which to contact, and information on the product the user desires to purchase. The MMI 212 may comprise a short range radio frequency interface, such as RF ID technology interface or NFC (Near Field Communication) interface, or Bluetooth or WiFi/WLAN or similar interface. Alternatively, the MMI 212 may comprise a code, for example a bar code or QR code that may be read by a camera or electronic reader on the terminal device.

In one embodiment the UI 211 comprises a set of keys, a touch screen or a voice recognition interface with at least a microphone and voice recognition software and/or hardware in order to recognize speech of a user. The user/client is able to use the UI 211 to input a phone number or an address of a terminal device, for example a phone number, email address or IP address. Further, the user is able to input information on the product 210 to purchase. This information could be a code, for example a numeric or alphanumeric code that identifies the particular product 210 the user desires to purchase.

After steps 155 and 159 (FIG. 9) the user owns an electronic purse or account 206 that can be contacted or accessed e.g. utilizing the internet, an IP connection, WiFi/WLAN, a mobile communication network. Accordingly, the electronic purse or account 206 can be located in the cloud 207 so to say. The electronic purse or account 206 comprises money or monetary funds (such as an amount in a currency, e.g. US dollars or euros, or in a digital currency such as bitcoins). The monetary funds could also be an acceptance by the user to debit his/her credit cards as in the well-known PayPal service.

In one embodiment a link is created between the electronic purse or account 206 and the terminal device 204, or address of the terminal device 204. When the user later purchases (after the first step illustrated by steps 150-152 in FIG. 9) a product from the automatic vending machine 200, the automatic vending machine 200 charges the cost for the purchased product 210 from the user's electronic purse or account 206 by utilizing the address of the terminal device 204. This enables the user to make future purchases from the automatic vending machine 200 as long as there are sufficient funds in the user's electronic purse or account 206.

In another embodiment, in future purchases (i.e., after the first purchase) the automatic vending machine 200 first sends a message, or causes a message to be sent by a mediator 202, to the user's terminal device 204 before it is allowed to charge for the product 210, and thus before completing the purchase. Alternatively, the message is sent by a service provider owning, representing or maintaining the vending machine 200. In this case the message could physically be sent from an equipment owned, maintained, controlled by or rented by the service provider. This could be a text message, email message, voice message or a push-type data message that is sent via or from a mediator in a similar manner as described in other embodiments herein, to which the user is allowed to respond. Once the user responds in a manner indicated as approval in the message, the purchase in completed and the user receives the product 210 from the vending machine 200.

In one embodiment the machine-to-machine-interface (MMI) 212 comprises a short range radio frequency interface, such as RF ID technology interface or NFC (Near Field Communication) interface, or Bluetooth or WiFi/WLAN or similar interface. Alternatively, the MMI 212 may comprise a code, for example a bar code or QR code that may be read by a camera or electronic reader on the terminal device.

In an embodiment, there is provided a QR code (Quick Response code) on or close to the product that is offered for purchase from the automatic vending machine. The terminal device comprises equipment to read a QR code, e.g. a camera and software enabling reading the QR code. This could be a camera and an application (an app) on a smart phone. The QR code identifies the product. Further the QR code may include information on the price of the product. The QR code may include a link to the automatic vending machine 200. The QR code may include a link to an electronic purse or account 208 of the automatic vending machine or of a service provider owning, representing or maintaining the vending machine 200. Accordingly, for future purchases (after the first purchase) the user can use the terminal device 204 to read the QR code and obtain all or some of the before mentioned information. The user may allow charging his/her electronic purse or account 206 to move funds corresponding to the price of the product 210 from the user's electronic purse or account 206 to the electronic purse or account 208 of the automatic vending machine 200 or of a service provider owning, representing or maintaining the vending machine 200. Once the product 210 is paid for, the user obtains the product 210 from the vending machine 200.

When the electronic purse or account has been opened after the first purchase, and the user wants to make a new purchase the automatic vending machine 200 first sends a message, or causes a message to be sent by the mediator 202, to the user's terminal device 204 before it is allowed to charge for the product 210, and thus before completing the purchase. Alternatively, the message is sent by a service provider owning, representing or maintaining the vending machine 200. In this case the message could physically be sent from an equipment owned, maintained, controlled by or rented by the service provider. This could be a text message, email message, voice message or a push-type data message that is sent via or from the mediator 202 in a similar manner as described in other embodiments herein to which the user is allowed to respond. Once the user responds in a manner indicated as approval in the message, the purchase is completed and the user receives the product 210 from the vending machine 200.

In another embodiment, instead of using a QR code the above mentioned information (product information, price, vending machine identification and information to an electronic purse or account of the vending machine or service provider) is transferred utilizing RF ID technology. One example of RF ID technology is NFC (Near Field Communication). In such an embodiment there is provided an RF ID tag on the vending machine 200, and the terminal device 204 comprises an RF ID reader that is used to read the information from the tag, and then proceed in a similar manner to complete the payment as with the QR code. Alternative technologies could be other short range wireless technologies such as Bluetooth, WiFi, ZigBee etc.

Figure 11:
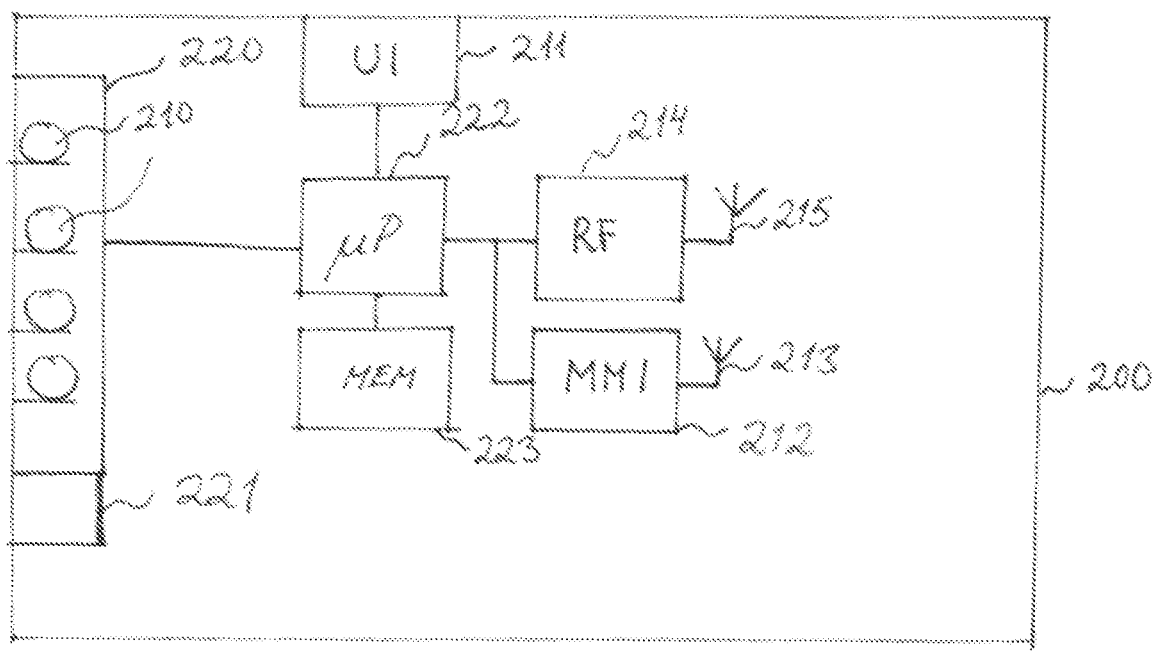
FIG. 11 shows an automatic vending machine.

FIG. 11 discloses an automatic vending machine 200. The vending machine comprises storage 220 for storing physical or digital products 210 for users/clients to purchase. There is also provided a dispenser 221 for dispensing products 210 to users. The vending machine 200 includes a controller 222 for controlling the operation of the vending machine. The controller 222 can be a processor operating under control of program code stored in a memory 223.

The automatic vending machine 200 comprises at least one of a user interface (UI) 211 or machine-to-machine-interface (MMI) 212. The user interface 211 enables the user (client) to type in a phone number or an address of a terminal device, which to contact, and information on the product the user desires to purchase. The MMI 212 may comprise a short range radio frequency interface, such as RF ID technology interface or NFC (Near Field Communication) interface, or Bluetooth or WiFi/WLAN or similar radio frequency interface. Alternatively, the MMI 212 may comprise a code, for example a bar code or QR code that may be read by a camera or electronic reader on the terminal device.

In one embodiment the UI 211 comprises a set of keys, a touch screen or a voice recognition interface with at least a microphone and voice recognition software (stored in memory 223) and/or hardware in order to recognize speech of a user. The user/client is able to use the UI 211 to input a phone number or an address of a terminal device, for example a phone number, email address or IP address. Further, the user is able to input information on the product 210 to purchase. This information could be a code, for example a numeric or alphanumeric code that identifies the particular product 210 the user desires to purchase.

In one embodiment the vending machine comprises a communication module 214 communicating e.g. via a radio frequency antenna 215 utilizing for example a mobile communication network. Alternatively, module 214 could enable a land line connection such as via a copper or other wire or via an optical link. When a client has input the phone number or address of the client terminal device 204 and product 210 information (e.g. a product identification code marked on the product or vending machine) via the UI 211, the controller 222 starts operation according to the zero click payment method as illustrated in FIG. 9 and causes the communication module 214 to transmit the message (step 153) to the phone number suggesting to the user to open the electronic purse or account. Alternatively or additionally the communication module may be used for communicating with a service provider or a moderator and provide the user's phone number to the service provider or moderator. The service provider or moderator may then transmit the message (step 153) to the phone number suggesting to the user to open an electronic purse or account to be used for debiting for the product or service and/or future products or services. In future purchases the controller 222 can cause the communication module 214 to send information about the product 210 as well as price information to the terminal device 204. This transmission of information can take place directly to the terminal device e.g. via a mobile communication network, or via the mediator 202.

The transmission of a message via the mediator 202 to the terminal device 204 can function as approval of a purchase. This kind of authentication prevents misuse where someone could try to charge a product from someone else's account by providing the terminal address, such as a phone number, of another user.

The transmitted approval message that is transmitted from the communication module 214 could be sent to e.g. user address (here as an example a phone number) +35840123456 and include a sender's address +358440844001. User address and sender address can have other formats as well such as email address, IP address etc. Further the contents of the approval message can be "You are purchasing a bottle of Coca Cola, id 09 from machine 0156. Cost is $2.00. Accept by responding with A" The user responds using the terminal device 204 by sending a message with content A to the address +358440844001. The response message also includes the address of the user's terminal device. Upon the mediator 202 (or vending machine 200 directly) receiving a response message approving the purchase, the product price is charged from the user and the user obtains the product 210 via the dispenser 221. Accordingly, a dialogue is conducted between the terminal device 204 and the mediator 202 or vending machine 200.

The debiting of the product price can take place from the electronic purse or account 206 of the user/client. This can be done by the mediator 202 or vending machine 200 contacting the electronic purse or account 206. For this purpose the mediator 202 (or alternatively the vending machine) can be programmed to perform a check to see if the electronic purse or account contains sufficient funds to pay the price of the product 210. In case of the vending machine the memory 223 can include program code to be run by the controller 222 to perform the check. The mediator would correspondingly include logic (e.g. a processor operating according to program code stored in a memory) to perform the check. The electronic purse or account 206 can have an upper limit on how large payments can be debited from it. This is to further prevent misuse. Accordingly the check sequence could be following:

i. price <limit (e.g. $10)This step checks whether the price of the product is less than the upper limit of the electronic purse or account ii. credit >price This step checks that there is more funds in the electronic purse or account 206 than the cost of the product iii. No fraud flag This could be an optional additional step to prevent fraud where a fraud flag is triggered in case there is suspicious traffic on the electronic purse or account 206 iv. If Yes (and No fraud flag) approve payment or Send approval message to terminal deviceCharge is approved and transferred from the user's electronic purse or account 206 e.g. to the service provider's or vending machine's electronic purse or account 208. Alternatively an approval message transmission is activated as was described above to get the user's approval to the charge v. If No, send message to user to transfer more funds This would trigger another acceptance message to be sent to the terminal device 204 from the mediator 202 similarly as described here before. If the user approves transfer of more funds to the electronic purse or account, a second approval message would then be activated to approve the payment

The automatic vending machine can be provided with products 210 that users can purchase and obtain from the automatic vending machine 200. The automatic vending machine 200 can also be an automated storage where access is provided instead of acquiring a product. For example, an automated post box which has electronic locks. By providing a specific code or other access authentication (such as NFC, Near Field Communication) a door is opened at the automated storage. Accordingly, an automatic vending machine 200 is to be understood broadly as providing access to physical objects such as soft drinks, refrigerated or dry food, DVDs, or downloading a file, such as video, from the machine, or accessing a space such as a post office box. In case of a digital product, e.g. a file, the downloading of the file from the vending machine 200 to the terminal device 204 can start upon the mediator 202 or vending machine 200 receiving the response message approving the payment.

Figure 12:
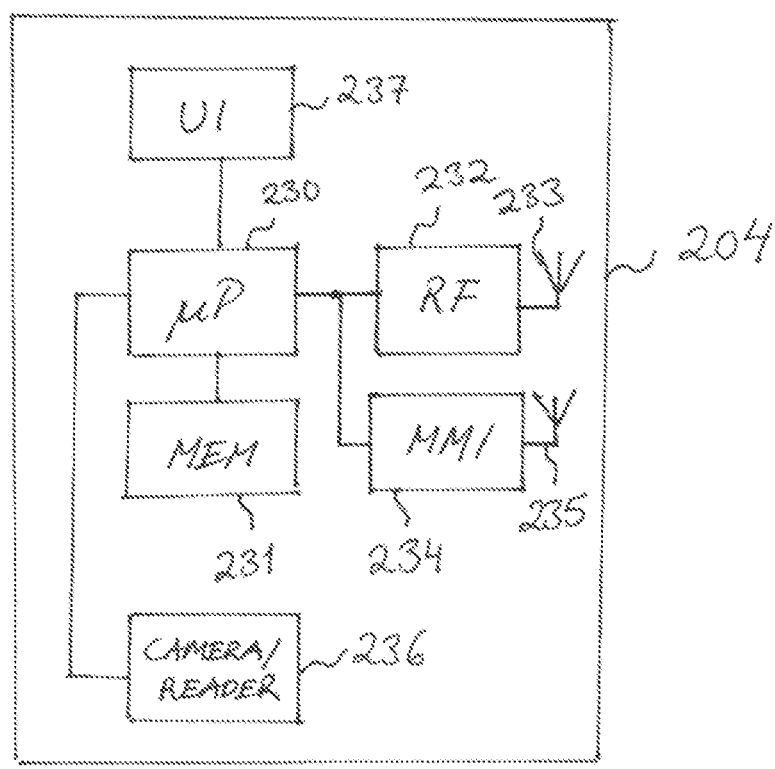
FIG. 12 shows a terminal device.

FIG. 12 discloses a terminal device 204. The terminal device 204 is in this example disclosed as a mobile terminal utilizing a wireless communication interface. Examples of mobile terminals are mobile phones and smart phones utilizing communication and connections according to e.g. 3G or LTE standards for voice calls and data transfer. The terminal device 204 includes a controller 230 for controlling the operation of the vending machine. The controller 230 can be a processor operating under control of program code stored in a memory 231. The controller 230 together with the program code stored in the memory 231 performs the functions of the terminal device in relation to the payment method. The mobile connection and messaging to and with the cloud 207 and mediator 202, and alternatively to the vending machine 200, can take place via an RF module 232 and antenna 233. The RF module may operate according to e.g. the GSM, 3G such as WCDMA, or LTE standards. The RF module 232 is controlled by the processor 230.

The terminal device 204 may also comprise a machine-to-machine-interface (MMI) 234 and corresponding antenna 235 for implementing short range radio frequency communication, such as communication over RF ID technology interface or NFC (Near Field Communication), or Bluetooth or WiFi/WLAN, ZigBee or similar technology.

In an embodiment, there is provided a QR code (Quick Response code) on or close to the product that is offered for purchase from the automatic vending machine. The terminal device comprises equipment 236 to read a QR code, e.g. a camera and software (stored in memory 231) enabling reading the QR code. This could be a camera and an application (an app) on a smart phone. The QR code identifies the product. Further the QR code may include information on the price of the product. The QR code may include a link to the automatic vending machine 200. The QR code may include a link to an electronic purse or account 208 of the automatic vending machine or of a service provider owning, representing or maintaining the vending machine 200. Accordingly, the user can use the terminal device 204 to read the QR code and obtain all or some of the before mentioned information. The user may allow charging his/her electronic purse or account 206 to move funds corresponding to the price of the product 210 from the user's electronic purse or account 206 to the electronic purse or account 208 of the automatic vending machine 200 or of a service provider owning, representing or maintaining the vending machine 200. Once the product 210 is paid for, the user obtains the product 210 from the vending machine 200.

In an embodiment the automatic vending machine 200 first sends a message, or causes a message to be sent by the mediator 202, to the user's terminal device 204 before it is allowed to charge for the product 210, and thus before completing the purchase. Alternatively, the message is sent by a service provider owning, representing or maintaining the vending machine 200. In this case the message could physically be sent from an equipment owned, maintained, controlled by or rented by the service provider. This could be a text message, email message, voice message or a push-type data message that is sent via or from the mediator 202 in a similar manner as described in other embodiments herein to which the user is allowed to respond. Once the user responds in a manner indicated as approval in the message, the purchase in completed and the user receives the product 210 from the vending machine 200. The user is allowed to respond by using the user interface 237 on the terminal device 204. This could be a keypad, display or both, or alternatively a touch screen or voice recognition.

In another embodiment, instead of using a QR code the above mentioned information (product information, price, vending machine identification and information to an electronic purse or account of the vending machine or service provider) is transferred utilizing RF ID technology. One example of RF ID technology is NFC (Near Field Communication). In such an embodiment there is provided an RF ID tag on the vending machine 200, and the terminal device 204 comprises as the MMI 234 an RF ID reader that is used to read the information from the tag, and then proceed in a similar manner to complete the payment as with the QR code. Alternative technologies could be other short range wireless technologies such as Bluetooth, WiFi, ZigBee etc.

Although the present invention has been described in considerable detail with reference to certain preferred versions thereof, other versions are possible. Therefore the spirit and scope of the appended claims should not be limited to the preferred versions herein.

What is claimed is:

1. A communication method for facilitating payment for a product or service by a user using a mobile device to purchase the product or service, the method comprising:
    inputting a phone number of the user's mobile device to an apparatus by at least one of the following: inputting the phone number of the user's mobile device to the apparatus via an electronic User Interface (UI) provided on the apparatus, or
    receiving, from the user's mobile device, the phone number of the user's mobile device, at the apparatus via a wireless machine-to-machine interface (MMI) provided both in the user's mobile device and in the apparatus;
    providing the product or service, via the apparatus, to the user for free in response to, and based on, analysis of the phone number received via the electronic UI or the wireless MMI, wherein the analysis includes determining whether, and confirming that, the phone number has not been used previously to obtain the product or service for free, thereby preventing multiple uses of the same phone number for the product or service;
    after providing the product or service to the user for free, transmitting or causing transmission of a funds transfer instruction message that is a short messaging service text message to the phone number of the user's mobile device directing the user to transfer funds to an electronic purse or account to be used for purchasing future products or services to be authorized by payment approval using the user's mobile device;
    in response to the user opening an electronic purse or account, sending a request message that is a short messaging service text message to the user's mobile device requesting the user to provide at least one of credit card information and bank account information, which is to be linked to the electronic purse or account for transfer of monetary funds to the electronic purse or account;
    sending a suggestion message that is a short messaging service text message to the phone number suggesting alternative amounts of monetary funds to be transferred to the electronic purse or account; and
    receiving a response message that is a short messaging service text message from the user's mobile device indicating the selection of the amount of the alternative amounts of monetary funds,
    wherein the funds transfer instruction message, the request message and the suggestion message are included in messages that are sent from or received at a plurality of reply addresses by a server, wherein each message of the messages correspond to one of the plurality of reply addresses, the server prepares the messages by selecting a reply address from the plurality of reply addresses that corresponds to each message of the messages for each of the messages, and using the selected reply addresses as a sender's address for the messages, the server performs message sending by sending the messages to the user's mobile device via the communication network, and the server receives a reply message from the user's mobile device via the communication network at one of the selected reply addresses, and
    wherein the server identifies whether the reply message corresponds to the funds transfer message, the request message or the suggestion message based on the one of the selected reply addresses at which the reply message is received and based on the phone number of the mobile device that sent the reply message.

2. The payment method of claim 1, further comprising the apparatus interacting with a server to cause transmission of a payment approval message that is a short messaging service text message to the mobile device of the user associated with the phone number.

3. The payment method of claim 1, wherein the apparatus has at least one of a connection to the internet and a telephone connection.

4. An apparatus configured to facilitate payment for a product or service by a user using a mobile device to purchase the product or service, the apparatus comprising:
    a memory that includes information about the product or service that is being offered for purchase to the user;
    an electronic user interface (UI) to be used by the user for providing a phone number of the user's mobile device to the apparatus, or a wireless machine-to-machine interface (MMI) for wirelessly receiving the phone number of the user's mobile device to the apparatus; at least one processor; and at least one memory including computer program code, the at least one memory and the computer program code co-operating with the at least one processor, to cause the apparatus to:
    provide the user with the product or service for free in response to, and based on, analysis of the phone number received from the user via the electronic UI or the wireless MMI, wherein the analysis includes determining whether, and confirming that, the phone number has not been used previously to obtain the product or service for free, thereby preventing multiple uses of the same phone number for the product or service; and
    transmit or cause transmission of a funds transfer instruction message that is a short messaging service text message to the phone number of the user's mobile device directing the user to open an electronic purse or account to be used for debiting for future products or services to be authorized by payment approval using the user's mobile device,
    wherein the apparatus further comprises a communication module for communication with external devices, the communication module being configured to:
    transmit a funds transfer instruction message that is a short messaging service text message to the phone number requesting the user to open the electronic purse or account; and communicate with a server including providing the phone number to the server to cause the server to transmit the funds transfer instruction message that is a short messaging service text message to the phone number of the user's mobile device suggesting to the user to open an electronic purse or account to be used for debiting for the future products or services, wherein the communication module sends a suggestion message that is a short messaging service text message to the phone number suggesting alternative amounts of monetary funds to be transferred to the electronic purse or account, and receives a response message that is a short messaging service text message from the user's mobile device indicating the selection of the amount of the alternative amounts of monetary funds, and wherein the funds transfer instruction message, the request message and the suggestion message are included in messages that are sent from or received at a plurality of reply addresses by a server, wherein each message of the messages correspond to one of the plurality of reply addresses, the server prepares the messages by selecting a reply address from the plurality of reply addresses that corresponds to each message of the messages for each of the messages, and using the selected reply addresses as a sender's address for the messages, the server performs message sending by sending the messages to the user's mobile device via the communication network, and the server receives a reply message from the user's mobile device via the communication network at one of the selected reply addresses, and wherein the server identifies whether the reply message corresponds to the funds transfer message, the request message or the suggestion message based on the one of the selected reply addresses at which the reply message is received and based on the phone number of the mobile device that sent the reply message.

5. The apparatus of claim 4, wherein the apparatus interacts with the server to cause transmission of a payment approval message that is a short messaging service text message to the mobile device of the user associated with the phone number.

6. The apparatus of claim 4, wherein the apparatus has at least one of a connection to the internet and a telephone connection.

7. A server configured to facilitate payment for a product or service by a user using a mobile device to purchase the product or service, the server being coupled to a communication network and providing an interface between the user's mobile device and at least one application coupled to the communication network, the server comprising:

a memory that includes information about the product or service that is being offered for purchase to the user;

an electronic user interface (UI) to be used by the user for providing a phone number of the user's mobile device to the server, or a wireless machine-to-machine interface (MMI) for wirelessly receiving the phone number of the user's mobile device to the server; at least one processor; and at least one memory including computer program code, the at least one memory and the computer program code co-operating with the at least one processor, to cause the server to:

provide the user with the product or service for free in response to, and based on, analysis of the phone number received from the user via the electronic UI or the wireless MMI, wherein the analysis includes determining whether, and confirming that, the phone number has not been used previously to obtain the product or service for free, thereby preventing multiple uses of the same phone number for the product or service; and transmit or cause transmission of a funds transfer instruction message that is a short messaging service text message to the phone number of the user's mobile device directing the user to open an electronic purse or account to be used for debiting for future products or services to be authorized by payment approval using the user's mobile device, wherein the server further comprises a communication module for communication with external devices, the communication module being configured to:

transmit a funds transfer instruction message that is a short messaging service text message to the phone number requesting the user to open the electronic purse or account; and communicate with a server including providing the phone number to the server to cause the server to transmit the funds transfer instruction message that is a short messaging service text message to the phone number of the mobile device suggesting to the user to open an electronic purse or account to be used for debiting for the future products or services, wherein the communication module sends a suggestion message that is a short messaging service text message to the phone number suggesting alternative amounts of monetary funds to be transferred to the electronic purse or account, and receives a response message that is a short messaging service text message from the user's mobile device indicating the selection of the amount of the alternative amounts of monetary funds, and wherein the funds transfer instruction message, the request message and the suggestion message are included in messages that are sent from or received at a plurality of reply addresses by a server, wherein each message of the messages correspond to one of the plurality of reply addresses, the server prepares the messages by selecting a reply address from the plurality of reply addresses that corresponds to each message of the messages for each of the messages, and using the selected reply addresses as a sender's address for the messages, the server performs message sending by sending the messages to the user's mobile device via the communication network, and the server receives a reply message from the user's mobile device via the communication network at one of the selected reply addresses, and wherein the server identifies whether the reply message corresponds to the funds transfer message, the request message or the suggestion message based on the one of the selected reply addresses at which the reply message is received and based on the phone number of the mobile device that sent the reply message.

8. The server of claim 7, wherein the at least one application is an application enabling purchasing at least one of items and services.

9. The server of claim 7, wherein at least one message prepared and sent by the server includes an inquiry based on information received by the server from the at least one application.

10. The server of claim 7, wherein the messages prepared and sent by the server is part of a dialogue.

11. The server of claim 10, wherein the dialogue includes an inquiry to another entity communicating with the server.

12. The server of claim 10, wherein the dialogue includes at least one message that informs the user of the mobile device receiving the messages which are prepared and sent by the server.

13. The server of claim 10, wherein the dialogue includes an inquiry directed to the user of the mobile device receiving the messages which are prepared and sent by the server.

14. The server of claim 13, wherein the inquiry pertains to a choice to be made by the user of the mobile device receiving the messages which are prepared and sent by the server.

15. The server of claim 14, wherein the choice is based on information received by the server from the at least one application.

16. The server of claim 7, wherein the server stores received reply messages in a multi-dimensional data structure with a relationship between a mobile device address of the mobile device sending a reply message and a selected reply address at which the reply message is received.

17. The method of claim 1, wherein the machine-to-machine interface (MMI) comprises at least one of the following: a short-range radio frequency interface, RFID interface, NFC (Near Field Communication) interface, Bluetooth interface, WiFi/WLAN interface or a camera or electronic reader readable bar code or QR code (Quick Response code).

* * * * *